(12) United States Patent
Kumar et al.

(10) Patent No.: US 10,929,803 B2
(45) Date of Patent: Feb. 23, 2021

(54) AUGMENTED REALITY BASED CARGO LOADING OPTIMIZATION

(71) Applicant: Accenture Global Solutions Limited, Dublin (IE)

(72) Inventors: Pravesh Kumar, Delhi (IN); Chirag Kakkar, Jalandhar (IN); Sarath Chandran Kurup, Bangalore (IN); Sourav Mukherjee, New Delhi (IN); Sanveer Singh, Mohali (IN); Harshit Nigam, Uttar Pradesh (IN); Prashant Sanghvi, Gurgaon (IN); Jose Paulino Bleda Lorenzo, Barcelona (ES)

(73) Assignee: Accenture Global Solutions Limited, Dublin (IE)

( * ) Notice: Subject to any disclaimer, the term of this patent is extended or adjusted under 35 U.S.C. 154(b) by 0 days.

(21) Appl. No.: 16/436,423

(22) Filed: Jun. 10, 2019

(65) Prior Publication Data

US 2020/0279208 A1 Sep. 3, 2020

(30) Foreign Application Priority Data

Feb. 28, 2019 (EP) .................................... 19382150

(51) Int. Cl.
*G06Q 10/08* (2012.01)
*G06T 7/50* (2017.01)
(Continued)

(52) U.S. Cl.
CPC ............. *G06Q 10/083* (2013.01); *G06T 7/50* (2017.01); *G06T 7/60* (2013.01); *G06T 7/70* (2017.01);
(Continued)

(58) Field of Classification Search
CPC . G06T 2207/20164; G06T 2207/10028; G06T 2207/30112; G06T 7/60; G06Q 10/083
See application file for complete search history.

(56) References Cited

U.S. PATENT DOCUMENTS 6,721,762 B1 * 4/2004 Levine ................... G06Q 10/04
10,242,333 B1 * 3/2019 Colucci, III ......... G06Q 10/083
(Continued)

FOREIGN PATENT DOCUMENTS

WO 2019028401 A1 2/2019

OTHER PUBLICATIONS

Extended European Search Report for Application No. EP19382150.1, dated Jun. 5, 2019, 8 pages.

*Primary Examiner* — Ryan R Yang
(74) *Attorney, Agent, or Firm* — Harrity & Harrity, LLP

(57) ABSTRACT

An augmented reality (AR) device may identify a package in using a camera of the AR device. The AR device may identify a first corner of the package based on detecting differences in contrast, of a plurality of surfaces of the package, in a video feed generated by the AR device. The AR device may identify, based on identifying the first corner, a second corner of the package, a third corner of the package, and a fourth corner of the package. The AR device may determine a plurality of dimensions of the package. The AR device may transmit, to a shipping management platform, information identifying the plurality of dimensions, wherein the plurality of dimensions is to be used to generate a loading configuration for loading the package, along with a plurality of other packages, into a cargo container.

20 Claims, 15 Drawing Sheets

(51) Int. Cl.
    *G06T 7/70*    (2017.01)
    *G06T 7/60*    (2017.01)
    *G06T 11/60*   (2006.01)
(52) U.S. Cl.
    CPC .... *G06T 11/60* (2013.01); *G06T 2207/10016* (2013.01); *G06T 2207/10028* (2013.01); *G06T 2207/20164* (2013.01)

(56) References Cited

U.S. PATENT DOCUMENTS

| | | | |
|---|---|---|---|
| 2014/0072205 A1* | 3/2014 | Ishii | G06T 15/08 382/154 |
| 2015/0130592 A1 | 5/2015 | Lakshminarayanan et al. | |
| 2015/0213610 A1* | 7/2015 | Guo | G06K 9/00463 382/173 |
| 2016/0368643 A1* | 12/2016 | Serjeantson | B65B 57/06 |
| 2017/0161673 A1* | 6/2017 | High | G06Q 10/083 |
| 2017/0369194 A1* | 12/2017 | Kittanakere Naagaraj | B65B 3/022 |
| 2018/0061255 A1* | 3/2018 | Ekambaram | B65B 57/00 |
| 2018/0374232 A1* | 12/2018 | Kadowaki | G07F 17/12 |
| 2019/0311214 A1* | 10/2019 | Lakemond | G06K 9/6215 |
| 2019/0342085 A1* | 11/2019 | Kube | H04L 9/3247 |
| 2019/0370721 A1* | 12/2019 | Issac | G06T 7/70 |
| 2020/0094091 A1* | 3/2020 | Skaaksrud | B60Q 9/00 |
| 2020/0134830 A1* | 4/2020 | Yu | G05B 19/40935 |

* cited by examiner

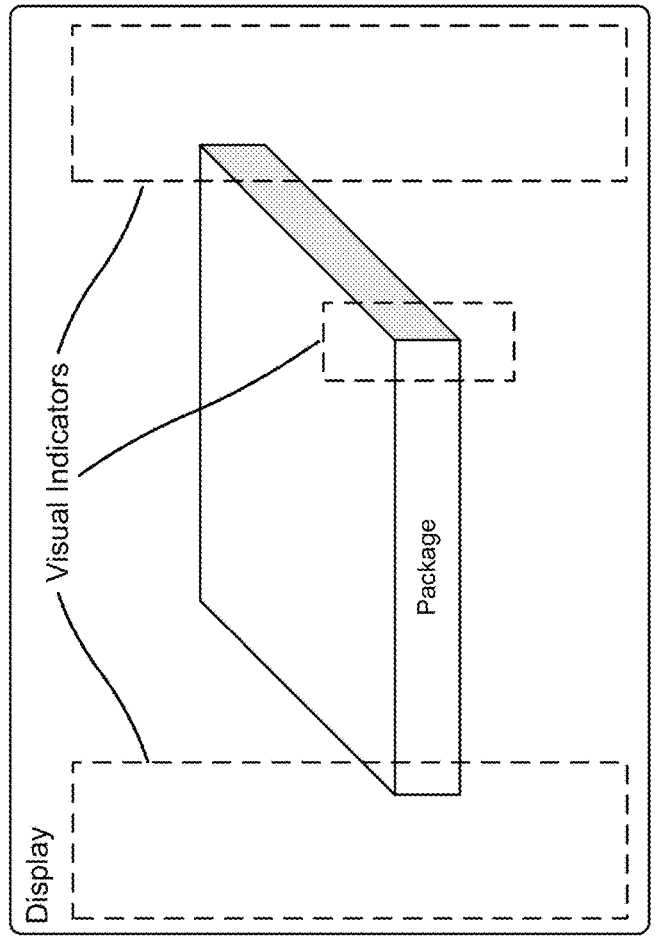
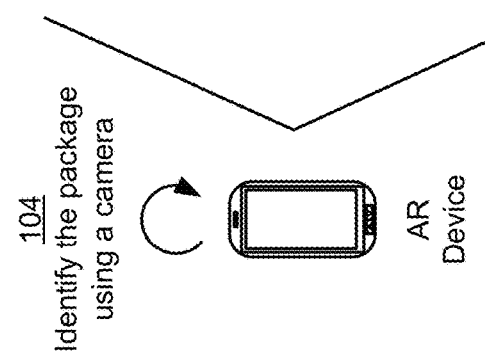
FIG. 1B

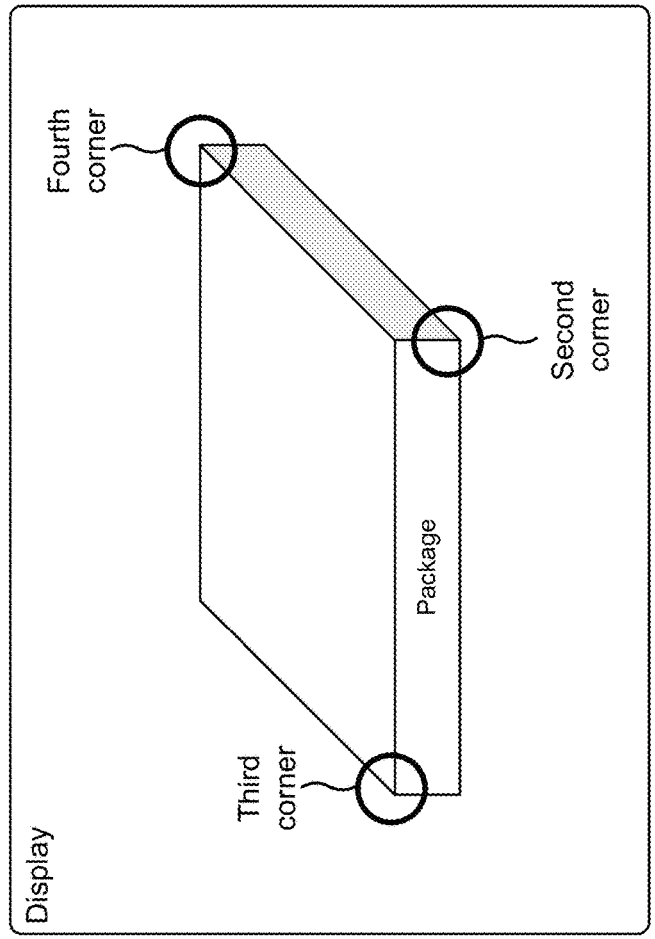
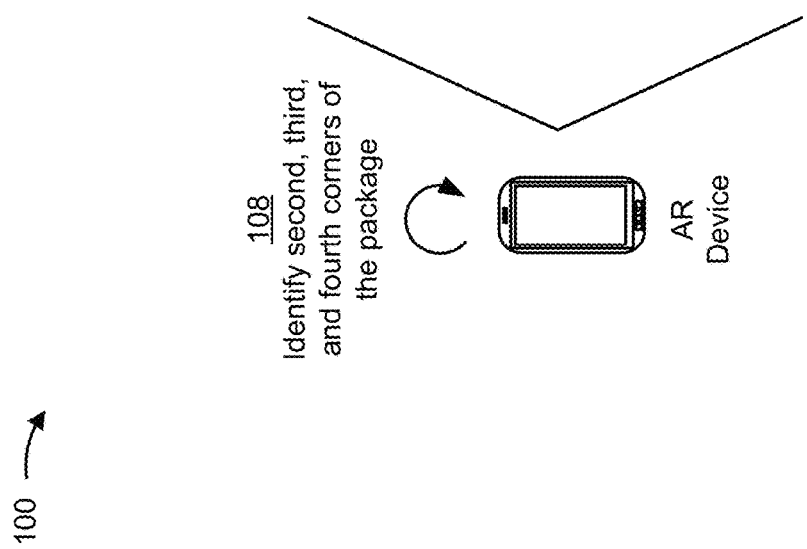
FIG. 1D

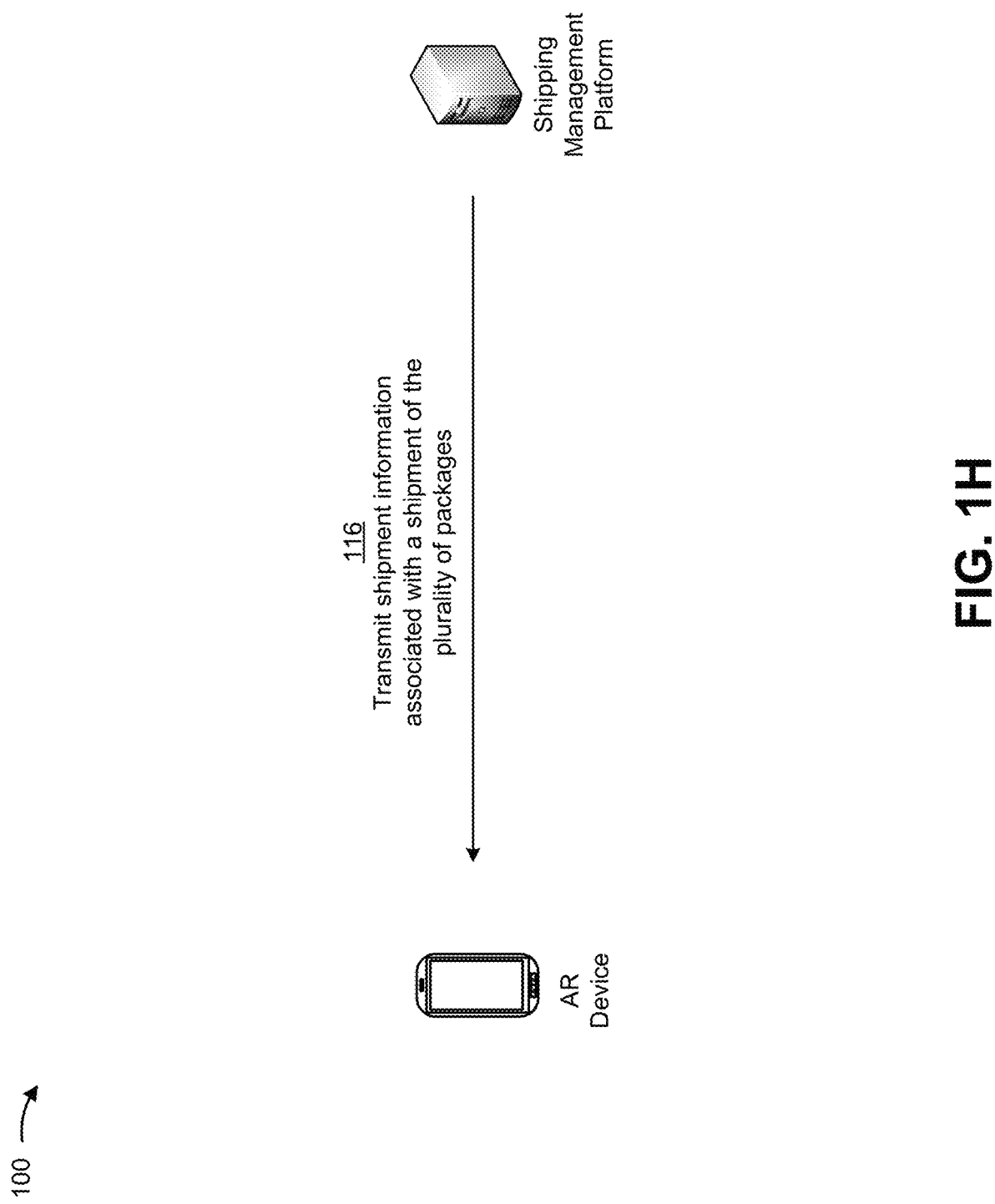

AUGMENTED REALITY BASED CARGO LOADING OPTIMIZATION

RELATED APPLICATION(S)

This application claims priority under 35 U.S.C. § 119 to European Patent Application No. EP19382150, filed on Feb. 28, 2019, the content of which is incorporated by reference herein in its entirety.

BACKGROUND

In the shipping and logistics industry, cargo may be loaded into various types of cargo containers (e.g., a cargo truck, a cargo ship, a cargo aircraft, an intermodal cargo container, and/or the like) and shipped to an intermediate or final destination.

SUMMARY

According to some implementations, an augmented reality (AR) device may include one or more memories, and one or more processors, communicatively coupled to the one or more memories, to identify a package in a video feed that is generated by the AR device. The one or more processors may identify a first corner of the package based on detecting differences in contrast, of a plurality of surfaces of the package, in the video feed. The one or more processors may identify, based on identifying the first corner, a second corner of the package, a third corner of the package, and a fourth corner of the package. The one or more processors may determine a plurality of dimensions of the package, wherein determining the plurality of dimensions comprises determining a first dimension, of the plurality of dimensions, associated with a distance between the first corner and the second corner, based on an estimated depth, in the video feed, of the first corner, and an estimated depth, in the video feed, of the second corner; determining a second dimension, of the plurality of dimensions, associated with a distance between the first corner and the third corner, based on the estimated depth, in the video feed, of the first corner, and an estimated depth, in the video feed, of the third corner; and determining a third dimension, of the plurality of dimensions, associated with a distance between the first corner and the fourth corner, based on the estimated depth, in the video feed, of the first corner and an estimated depth, in the video feed, of the fourth corner. The one or more processors may transmit, to a shipping management platform, information identifying the plurality of dimensions, wherein the plurality of dimensions is to be used to generate a loading configuration for loading the package, along with a plurality of other packages, into a cargo container.

According to some implementations, a method may include receiving, by a shipping management platform, package information associated with a plurality of packages, wherein package information associated with a particular package of the plurality of packages comprises information identifying the particular package and information identifying a set of dimensions of the particular package. The method may include generating, based on the package information associated with the plurality of packages, a loading configuration for loading the plurality of packages into a cargo container. The method may include storing, by the shipping management platform, the package information associated with the plurality of packages and shipment information, wherein the shipment information comprises information identifying the cargo container and information identifying the loading configuration. The method may include transmitting, by the shipping management platform and to an augmented reality (AR) device, the package information associated with the plurality of packages and the shipment information, wherein the package information associated with the plurality of packages and the shipment information are to be used, by the AR device, to display instructions for loading the plurality of packages into the cargo container.

According to some implementations, a non-transitory computer-readable medium may store instructions that include one or more instructions that, when executed by one or more processors of a transaction platform, cause the one or more processors to receive, from a shipping management platform, package information associated with a plurality of packages and shipment information, wherein the shipment information comprises information identifying a cargo container and information identifying a loading configuration for loading the plurality of packages into the cargo container. The one or more instructions may cause the one or more processors to generate, based on receiving the package information and the shipment information, an instruction, for display on a display of the AR device, to scan a tag associated with a package of the plurality of packages. The one or more instructions may cause the one or more processors to generate, based on detecting the scan of the tag, an instruction, for display on the display of the AR device, to load the package into the cargo container according to the loading configuration. The one or more instructions may cause the one or more processors to determine that the package has been loaded into the cargo container according to the loading configuration. The one or more instructions may cause the one or more processors to transmit, to the shipping management platform and based on determining that the package has been loaded into the cargo container according to the loading configuration, information indicating that the package has been loaded into the cargo container according to the loading configuration.

BRIEF DESCRIPTION OF THE DRAWINGS

FIGS. 1A-1J are diagrams of an example implementation described herein.

DETAILED DESCRIPTION

Figure 1A:
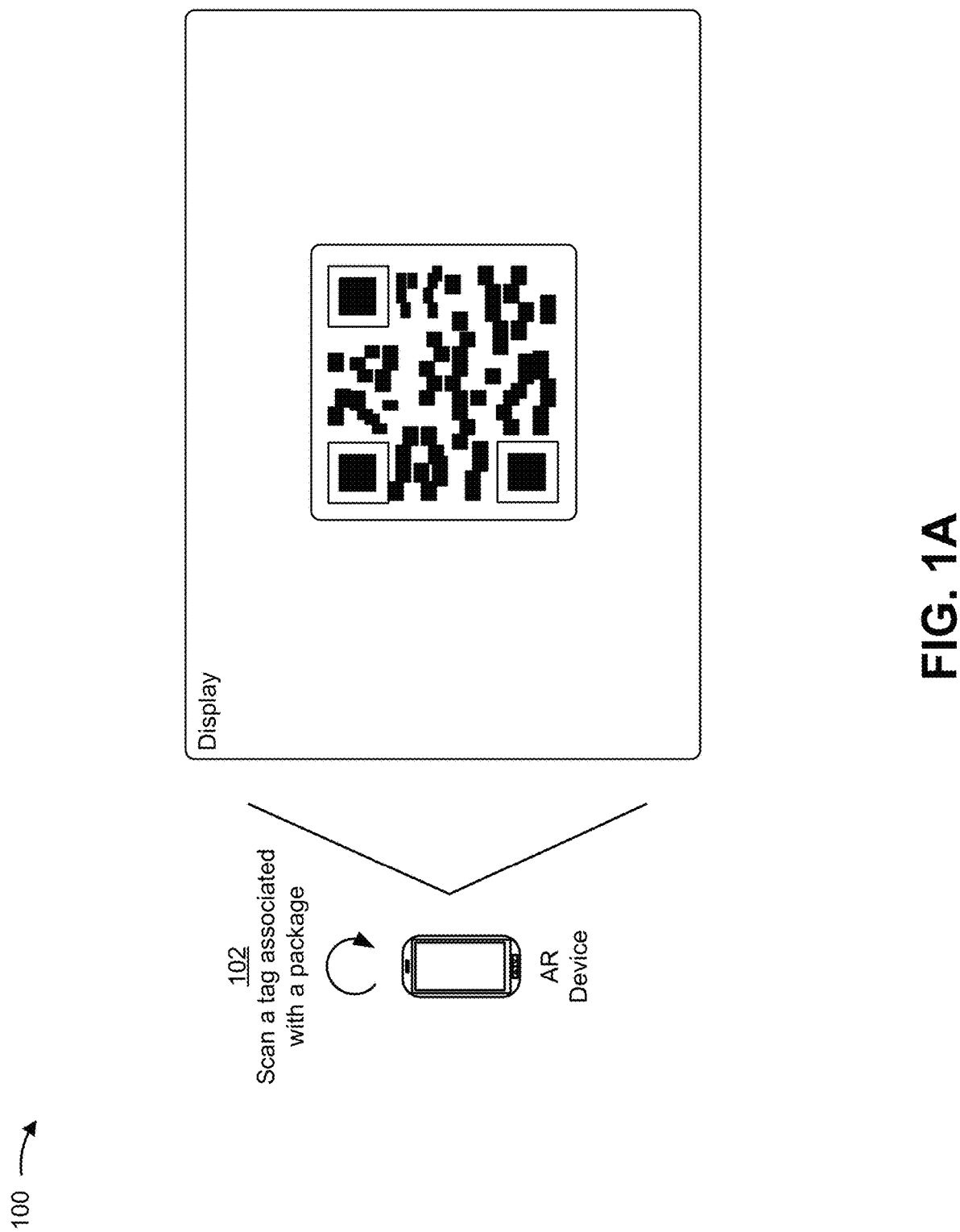

The following detailed description of example implementations refers to the accompanying drawings. The same reference numbers in different drawings may identify the same or similar elements.

When loading a cargo container with cargo, inefficient spatial utilization of the cargo container may result in a need to make additional shipments of the cargo container, may result in the need to load and transport additional cargo containers, and/or the like. The increased use of the cargo containers, due to the need to make additional shipments, can cause accelerated wear and tear on the cargo containers, which in turn shortens the life of the cargo containers. Moreover, this causes increased shipping logistics complexity and cost due to additional planning, scheduling, and management associated with making additional shipments of a cargo container, with loading and transporting additional cargo containers, and/or the like. For example, a 5-10% decrease in spatial utilization efficiency of a cargo container can cause hundreds of millions of dollars in additional shipping logistic costs, shipping costs, maintenance costs, and/or the like.

Some implementations described herein provide various devices that are capable of enabling cargo loading optimization. In some implementations, a device, such as an augmented reality (AR) device, may automatically determine a plurality of dimensions of a package (e.g., a box, envelop, and/or other another type of parcel that is capable of being used to ship goods and/or other physical items). The device may identify the package in a video feed generated by the device, may automatically detect a plurality of corners of the package, and may automatically determine the plurality of dimensions based on various distances between the plurality of corners with high accuracy (e.g., 95%+ accuracy). The device may transmit the plurality of dimensions to a shipping management platform, which may store information identifying the plurality of dimensions for the package along with information identifying a plurality of dimensions for a plurality of other packages.

In this way, several different stages of the process for determining a plurality of dimensions for a package are automated, which may remove human subjectivity and waste from the process, and which may improve speed and efficiency of the process. Furthermore, implementations described herein use a rigorous, computerized process for determining a plurality of dimensions for a package that were not previously performed or were previously performed using subjective human intuition or input. For example, currently there does not exist a technique to automatically detect, in a video feed, corners of a package and determine distances between the corners to determine the plurality of dimensions of the package. In some implementations, the AR device may be capable of detecting packages of different shapes and/or multiple packages at once. For example, the AR device may be capable of detecting spherical-shaped packages, cylindrical shaped packages, pie-shaped packages, and/or the like.

In some implementations, the shipping management platform is capable of automatically generating a loading configuration for loading the plurality of packages into a cargo container. The shipping management platform may automatically generate the loading configuration based on a plurality of dimensions of the cargo container, based on a plurality of packages to be loaded into the cargo container, and/or the like. In this way, the shipping management platform may generate the loading configuration such that the spatial utilization of the cargo container is maximized, which decreases the need to make additional shipments of the cargo container, decreases the need to load and transport additional cargo containers to ship the plurality of packages, decreases the wear and tear on the cargo container and the additional cargo containers, decreases the complexity and cost of shipping logistics to load and transport the plurality of packages, and/or the like.

In some implementations, the shipping management platform may store package information associated with the plurality of packages, shipment information associated with a shipment of the plurality of packages, and/or the like, in a distributed ledger (e.g., a private blockchain, a public blockchain, a federated blockchain, and/or the like), which increases the security of the package information and the shipment information, increases the traceability of the package information and the shipment information, and/or the like.

In some implementations, the shipping management platform may provide the package information and the shipment information to an AR device (or an automated pick and place device) that is capable of using augmented reality to assist a user in quickly and efficiently loading the cargo container. The AR device may generate various instructions, for display on a display of the AR device, to guide the user in locating a package to be loaded into the cargo container, to identify, based on the loading configuration, a location and orientation in which to load the package in the cargo container, and/or the like. In this way, the AR device may permit the cargo container to be loaded more quickly, more efficiently, and with fewer mistakes than loading the cargo container without the AR device.

FIGS. 1A-1J are diagrams of an example implementation 100 described herein. As shown in FIGS. 1A-1J, implementation 100 may include various devices and components, such as one or more AR devices, a shipping management platform, a cargo container, a client device, and/or the like. In some implementations, the devices included in implementation 100 may be capable of augmented reality enabled cargo loading optimization for loading a plurality of packages (e.g., individual packages, palletized packages, and/or the like) into the cargo container.

In some implementations, the one or more AR devices may include one or more standalone AR devices (e.g., a smartphone, a tablet computer, a set of AR glasses, and/or the like), one or more AR systems (e.g., a portable display that is communicatively connected with a backend server, computer, or platform that performs processing of AR content to be displayed on the display), and/or the like.

In some implementations, an AR device, of the one or more AR devices, may be capable of performing one or more actions associated with a package that is to be shipped, such as scanning a tag associated with the package (e.g., a barcode, a quick response (QR) code, a radio frequency identifier (RFID) tag, a near-field communication (NFC) tag, a Bluetooth tag, and/or the like), determining a plurality of dimensions of the package (e.g., a height of the package, a length of the package, a width of the package, and/or the like), capable of providing information, associated with the package, to the shipping management platform, and/or the like.

In some implementations, an AR device, of the one or more AR devices, may be capable of receiving, from the shipping management platform, package information associated with a plurality of packages and shipment information associated with the plurality of packages. The shipment information may include information identifying a cargo container (e.g., a cargo truck, a cargo ship, a cargo aircraft, an intermodal cargo container, and/or the like), in which the plurality of packages is to be loaded, and information identifying a loading configuration for loading the plurality of packages into the cargo container. The AR device may generate various instructions, for display on a display of the AR device and based on the packaging information associated with the plurality of packages and the shipment information, to guide a user of the AR device in locating the plurality of packages and loading the plurality of packages into the cargo container.

In some implementations, the shipping management platform may be capable of receiving, from an AR device, package information associated with a plurality of packages, may be capable of generating, based on the package information, a loading configuration for loading the plurality of packages into a cargo container, may be capable of storing (e.g., on the shipment management platform, in a distributed ledger, in another location, and/or the like) the package information and shipment information that identifies the cargo container and the loading configuration, may transmit, to an AR device, the package information and the shipment information, may receive shipment updates from a location device associated with the cargo container and/or another device, may transmit, to the client device, the package information, the shipment information, and information associated with the shipment updates, and/or the like.

Turning to FIG. 1A, and as shown by reference number 102, to generate package information associated with a package, an AR device may scan a tag associated with the package. In some implementations, the shipper may generate the tag (e.g., when the package is received by the shipper), the sender may generate the tag, and/or the like. The tag may provide a means for maintaining and tracking shipment information associated with the package, a means for maintaining and tracking package information associated with the package, and/or the like. For example, the tag may be encoded with information identifying a package identifier associated with the package (e.g., a tracking number and/or another type of package identifier), and the shipping management platform may associate the shipment information and the package information with the package identifier. In this way, the shipment information and the package information may be retrieved from the shipping management platform based on the tag being scanned, based on the shipping management platform receiving an input that identifies the package identifier, and/or the like.

The shipment information, associated with the package, may include information identifying a sender of the package (e.g., a name of the sender, an address of the sender, and/or the like), information identifying a receiver of the package (e.g., a name of the receiver, a destination address of the receiver, and/or the like), information identifying a shipper of the package (e.g., information identifying a name of an entity that is responsible for the package for at least a portion of the shipment of the package from the sender to the receiver), information identifying a shipping service for the package (e.g., ground service, international service, express service, overnight service, and/or the like), and/or the like). The package information, associated with the package, may include information identifying contents of the package, information identifying a plurality of dimensions for the package (e.g., a height dimension, a length dimension, a width dimension, a weight dimension, and/or the like), information identifying the package (e.g., a package identifier associated with the package, such as a tracking number and/or another type of package identifier), information identifying one or more properties of the package (e.g., a shape of the package, whether the package includes a fragile item, whether the package includes a hazardous item, whether the package is a palletized set of packages, and/or the like), and/or the like.

In some implementations, the AR device may scan the tag associated with the package to retrieve, from the shipping management platform, the information associated with the tag, the shipment information, the package information, and/or the like. In some implementations, to scan the tag associated with the package, the AR device may generate, for display on a display of the AR device, an instruction to scan a tag associated with a package. In this way, the instruction may provide a visual indication (e.g., a verbal instruction (e.g., "Please scan the next tag"), a graphical instruction (e.g., a QR code application user interface, and/or the like), to a user of the AR device, to scan the tag associated with the package. In some implementations, instead of displaying the instruction, the AR device may be configured to automatically scan the tag associated with the package as part of an automated industrial shipping system. For example, the package may travel through a facility of the shipper on an automated conveyor belt system, and the AR device may be set up and configured to automatically scan the tag associated with the package as the package travels on the conveyor belt system.

Turning to FIG. 1B, and as shown by reference number 104, the AR device may identify the package using a camera of the AR device. In some implementations, the AR device may identify the package based on scanning the tag associated with the package. For example, the AR device may display, on the display of the AR device and based on scanning the tag associated with the device, the video feed and an instruction to place the package in a field of view of the camera of the AR device. In this way, a user may view the video feed on the display of the AR device, and may use the video feed as a visual guide to place the package in the field of view of the camera of the AR device.

In some implementations, to aid the user in placing and orienting the package in the field of view of the camera, and to increase the accuracy of the package identification, the AR device may display one or more visual indicators, on the display of the AR device, as an overlay on the video feed. The one or more visual indicators may include squares, rectangles, circles, and/or the like, that indicate, to the user, one or more regions of the video feed in which to locate particular portions of the package. For example, a first visual indicator may include a rectangle that is overlaid on a left-side region of the video feed, a second visual indicator may include a rectangle that is overlaid on a center region of the video feed, and a third visual indicator may include a rectangle that is overlaid on a right-side region of the video feed. In this way, the first visual indicator, the second visual indicator, and the third visual indicator may indicate, to the user, that the user is to locate the package, in the field of view of the camera, such that one or more corners of the package are located in each region that is associated with a visual indicator. Moreover, in this way, the first visual indicator, the second visual indicator, and the third visual indicator may indicate, to the user, that the user is to orient the package, in the field of view of the camera, such that the package is oriented in a perspective view, an isometric view, a trimetric view, and/or the like.

Figure 1C:
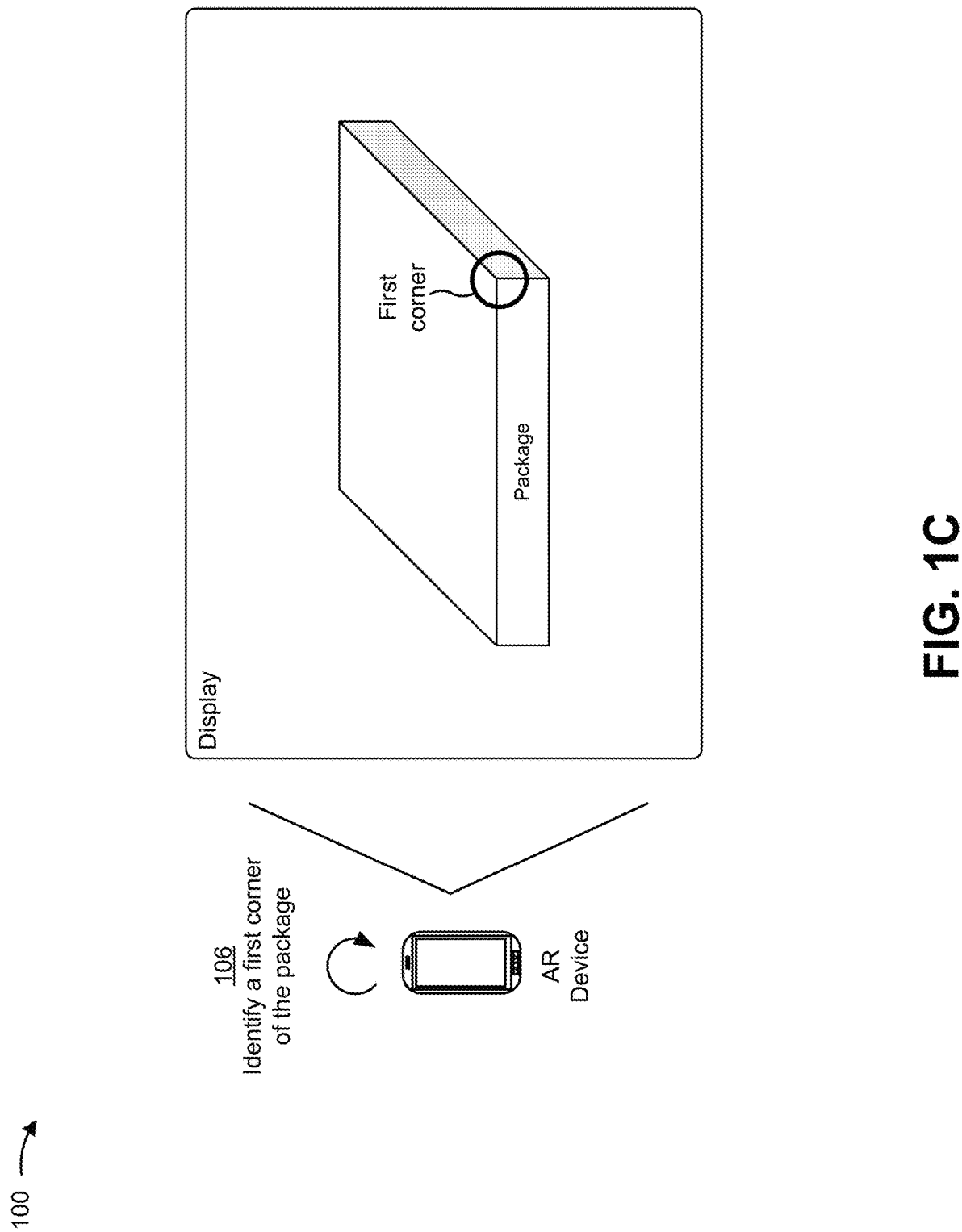

Turning to FIG. 1C, and as shown by reference number 106, the AR device may identify a first corner of the package based on identifying the package in a video feed generated by the AR device. For example, the AR device may identify the first corner of the package based on the first corner of the package being located in a particular region of the video feed (e.g., the center region of the video feed). In some implementations, the AR device may identify the first corner by analyzing the video feed (e.g., the portion of the video feed that includes the package, the center region of the video feed, and/or the like) to detect differences in contrast between various surfaces of the package. For example, the AR device may identify a point of the package, in the video feed, at which three contrast gradients meet (e.g., due to the package being oriented in a perspective view, an isometric view, or a trimetric view), which may indicate, to the AR device, that the point of the package is a corner of the package where three different surfaces of the package meet.

Turning to FIG. 1D, and as shown by reference number 108, the AR device may identify a second corner, a third corner, and a fourth corner of the package. For example, the AR device may identify the second corner, the third corner, and the fourth corner based on identifying the first corner, may identify the second corner, the third corner, and the fourth corner along with the first corner in a parallelized manner (e.g., concurrently with the first corner), and/or the like.

In some implementations, when identifying the second corner, the third corner, and the fourth corner based on identifying the first corner, the AR device may analyze portions of the package, in the video feed, relative to the location of the first corner. For example, the AR device may start at the location of the first corner, may identify a portion of the package, near the first corner, where two contrast gradients meet (which may be an edge of the package), and may traverse along the edge of the package until the AR device reaches the boundary between the package and the background of the video feed, which may be the location of the second corner of the package. The AR device may perform similar steps to identify the third corner and the fourth corner.

In some implementations, the AR device may identify the second corner, the third corner, and the fourth corner based on the second corner, the third corner, and the fourth corner being located in particular regions of the video feed. For example, the AR device may identify the third corner of the package based on the third corner of the package being located in the left-side region of the video feed. The AR device may identify the third corner by analyzing the in the left-side region of the video feed to identify a point of the package at which two contrast gradients meet near the boundary of the package, which may correspond to the location of the third corner. The AR device may perform similar steps to identify the second corner (e.g., in the center region) and the fourth corner (e.g., in the right-side region).

In some implementations, the AR device may perform blurring of the background portion of the video feed to further isolate the package from the background portion. In this way, the differences between the background portion of the video feed, and the package in the video feed, may be more pronounced in the video feed relative to the background portion not being blurred, which may increase the speed and accuracy of the corner identification of the AR device.

Figure 1E:
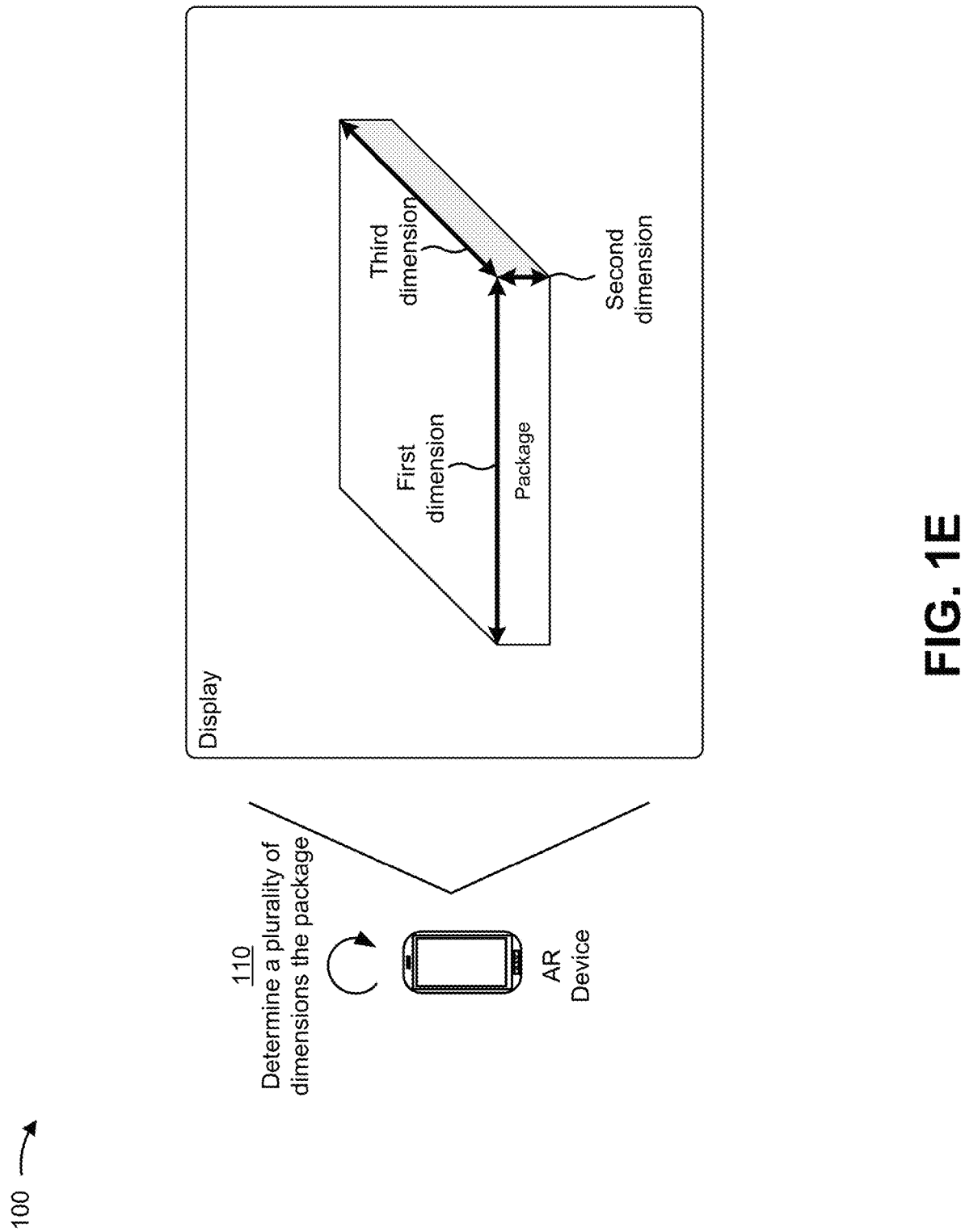

Turning to FIG. 1E, and as shown by reference number 110, the AR device may determine a plurality of dimensions of the package. For example, the AR device may determine the plurality of dimensions of the package based on identifying the first corner, the second corner, the third corner, and the forth corner of the package. In some implementations, the AR device may determine a first dimension (e.g., a height dimension) associated with a distance between the first corner and the second corner, may determine a second dimension (e.g., a width dimension) associated with a distance between the first corner and the third corner, and may determine a third dimension (e.g., a length dimension) associated with a distance between the first corner and the fourth corner). In some implementations, the AR device may also determine a weight dimension of the package, may receive information identifying the weight dimension of the package (e.g., via input from a user, from an electronic scale device, from the shipping management platform, and/or another device). In this way, the AR device may transmit, as package information associated with the package, the plurality of dimensions to the shipping management platform, and the shipping management platform may use the plurality of dimensions to generate a loading configuration for loading the package, along with a plurality of other packages, into a cargo container.

In some implementations, the AR device may determine a particular dimension, between two corners of the package, based on generating a three-dimensional point cloud associated with the package. The point cloud, associated with the package, may include a plurality of points, in three-dimensional space, that is associated with the surfaces, edges, and corners of the package. Each point, included in the point cloud, may be associated with a set of three-dimensional coordinates (e.g., an x coordinate, a y coordinate, and a z coordinate). The AR device may use the camera of the AR device to determine two of the three-dimensional coordinates, and may use a depth camera, that is capable of estimating the depth of various objects in the field of view of the camera, to estimate the depth of the points included in the point cloud, to determine the third coordinate. In this way, the AR device may identify a first point, included in the point cloud, associated with the first corner, may identify a second point, included in the point cloud, associated with the second corner, and may determine the distance between the first point and the second point, in three-dimensional space, to determine the height dimension of the package.

The AR device may determine the distance between the first point and the second point by determining differences between respective coordinates for the first point and the second point (e.g., by determining the difference between the x coordinate for the first point and the x coordinate for the second point, determining the difference between they coordinate for the first point and they coordinate for the second point, and determining the difference between the z coordinate for the first point and the z coordinate for the second point). The AR device may similarly determine the distance between the first point and the third point (e.g., to determine the width dimension), and the distance between the first point and the third point (e.g., to determine the length dimension). In some implementations, AR device may determine the distance between various corners of a package by creating a bounding box where there is need to have the overall dimensions of a group of objects.

In some implementations, to ensure the accuracy of the plurality of dimensions of the package, the AR device may display, on the display of the AR device, an augmented reality overlay that represents the plurality of dimensions. For example, the augmented reality overlay may include a first line (or another visual indicator), between the first corner and the second corner in the video feed, that represents the height dimension of the package, a second line, between the first corner and the third corner in the video feed, that represents the width dimension of the package, and a third line, between the first corner and the fourth corner in the video feed, that represents the length dimension of the package. In this way, the user may view the augmented reality overlay to determine whether the AR device accurately determined the locations of the first corner, the second corner, the third corner, and the fourth corner (e.g., by determining whether the first line, the second line, and the third line accurately line up with the edges between the first corner, the second corner, the third corner, and the fourth corner, by determining whether the first line accurately terminates at the first corner and the second corner, by determining whether the second line accurately terminates at the first corner and the third corner, by determining whether the third line accurately terminates at the first corner and the fourth corner, and/or the like). If the user determines, based on the augmented reality overlay, that the AR device has not accurately determined the plurality of the dimensions, the user may instruct the AR device to re-determine the plurality of dimensions, may provide input, to the AR device, to assist the AR device in identifying the corners of the package, and/or the like.

In this way, several different stages of the process for determining a plurality of dimensions for a package are automated, which may remove human subjectivity and waste from the process, and which may improve speed and efficiency of the process. Furthermore, implementations described herein use a rigorous, computerized process for determining a plurality of dimensions for a package that were not previously performed or were previously performed using subjective human intuition or input. For example, currently there does not exist a technique to automatically detect, in a video feed, corners of a package and determine distances between the corners to determine the plurality of dimensions of the package.

Figure 1F:
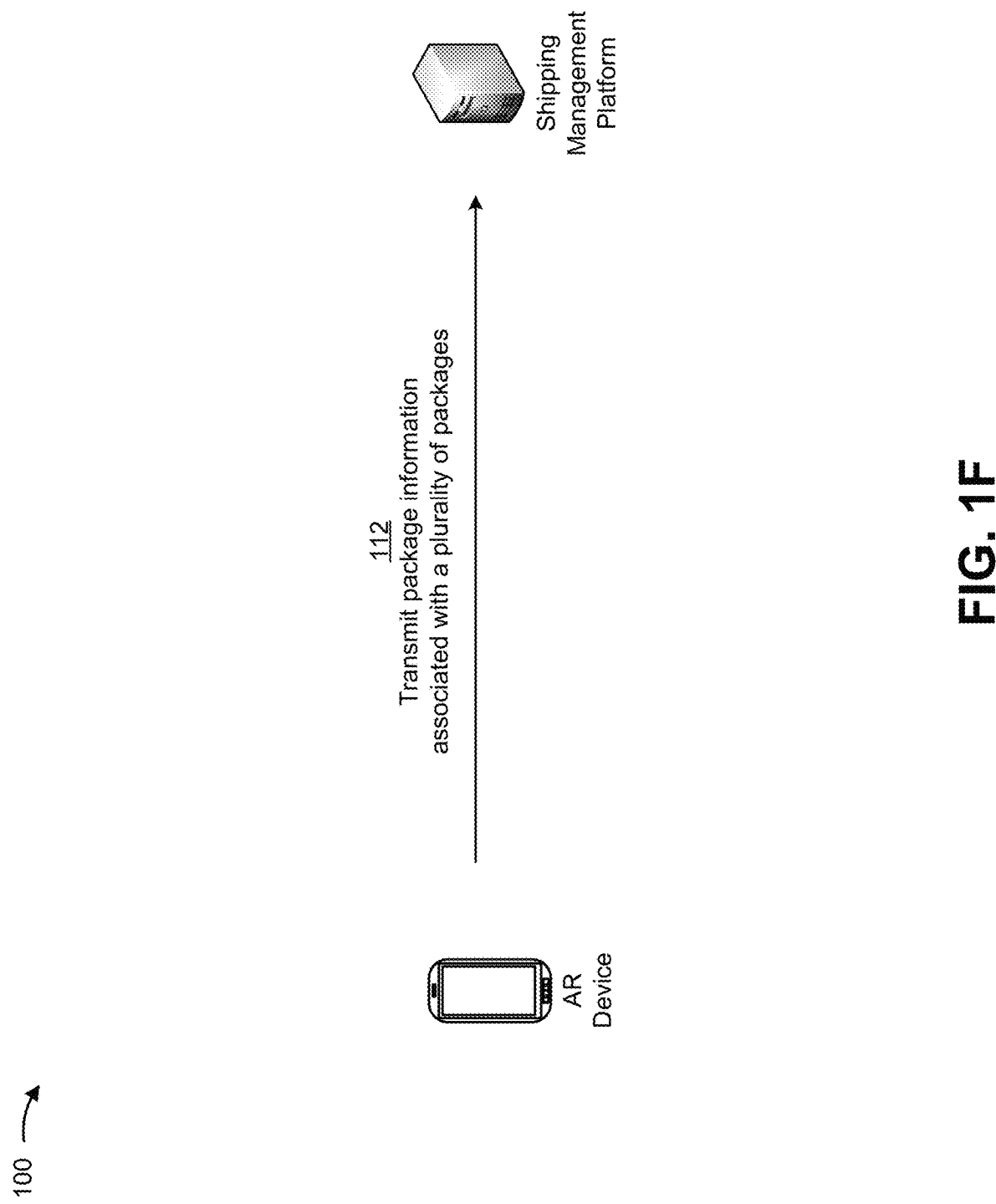

Turning to FIG. 1F, and as shown by reference number 112, the AR device may transmit, to the shipping management platform, package information associated with a plurality of packages. The package information, associated with a particular package, may include information identifying the contents of the package, information identifying a plurality of dimensions for the package (e.g., a height dimension, a length dimension, a width dimension, a weight dimension, and/or the like), information identifying the package (e.g., a package identifier associated with the package, such as a tracking number and/or another type of package identifier), information identifying one or more properties of the package (e.g., a shape of the package, whether the package includes a fragile item, whether the package includes a hazardous item, whether the package is a palletized set of packages, and/or the like), and/or the like.

The shipping management platform may store the package information, associated with the plurality of packages, in a shipment information store on the shipping management platform and/or another location, may store the package information, associated with the plurality of packages, in a distributed ledger (e.g., a private blockchain, a public blockchain, a federated blockchain, and/or the like) that is implemented by a plurality of distributed computing resources included in the shipping management platform, and/or the like. In some implementations, the shipping management platform may provide the AR device with direct access to the distributed ledger, and the AR device may directly store the package information, associated with the plurality of packages, in the distributed ledger. In some implementations, the shipping management platform may store the package information, associated with the plurality of packages, in an electronic file (e.g., an electronic spreadsheet file, an extensible markup language (XML) file, a JavaScript object notation (JSON) file, and/or the like) in the shipping information store, may generate a hash for the electronic file using a hash algorithm (e.g., a secure hash algorithm (SHA) based hash function, a message-digest five (MD5) hash algorithm, and/or the like), and may store the hash of the electronic file in the distributed ledger.

In some implementations, package information for respective packages of the plurality of packages may be stored in respective electronic files, and the shipping management platform may generate respective hashes for the respective electronic files. In this way, another device (e.g., the AR device, the client device, and/or the like), that is given access to a hash of an electronic file associated with a particular package, may retrieve the hash of the electronic file, and may use the hash to verify the veracity of the package information included in the electronic file (e.g., by retrieving the electronic file from the shipping information store, computing a hash for the electronic file, and verifying that the computed hash matches the hash that was obtained from the distributed ledger).

Figure 1G:
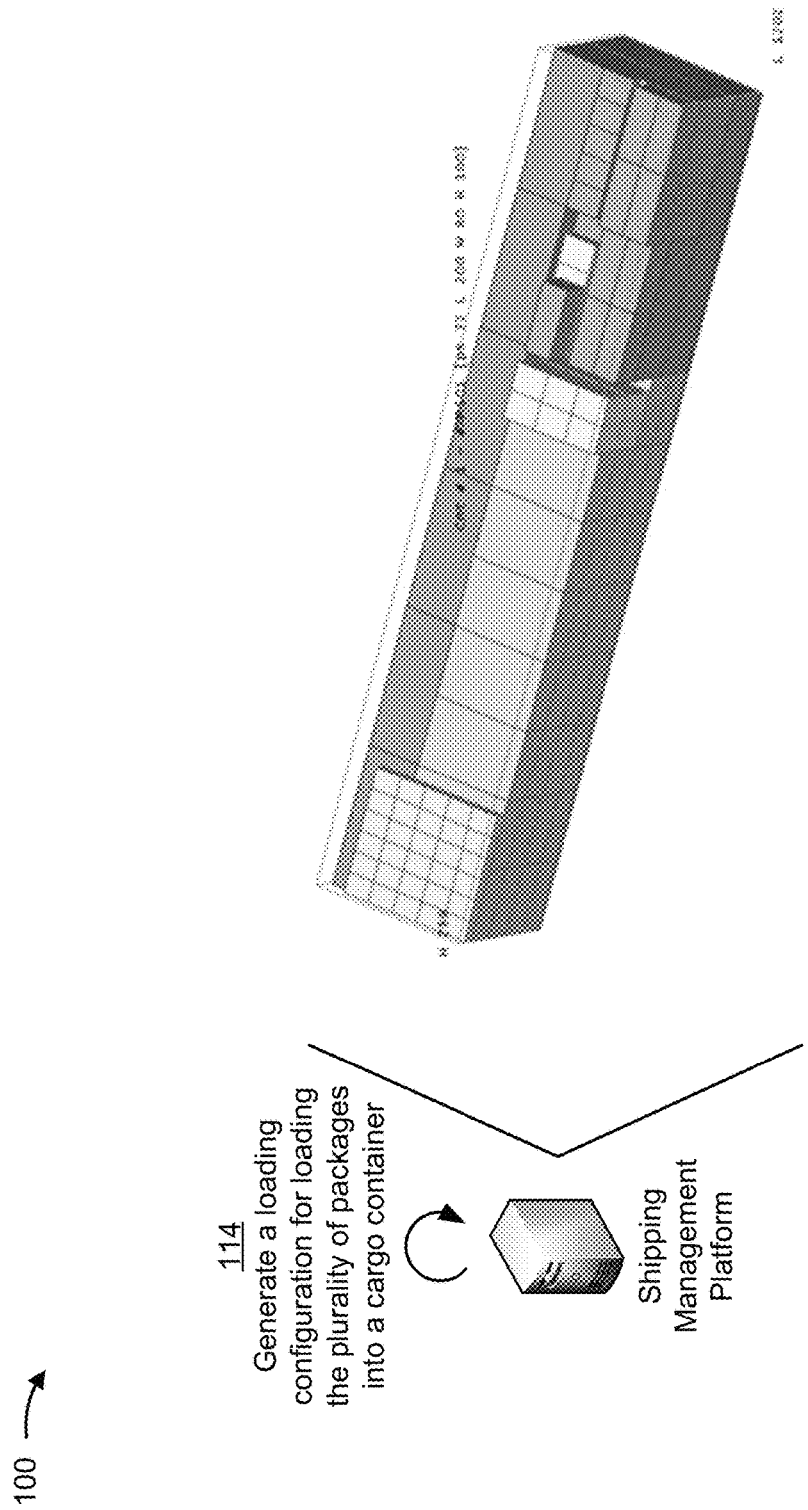

Turning to FIG. 1G, and as shown by reference number 114, the shipping management platform may generate a loading configuration for loading the plurality of packages into a cargo container. In some implementations, the loading configuration may include information identifying a planned configuration of the plurality of packages in the cargo container, may include information identifying an order in which to load the plurality of packages into the cargo container, and/or the like.

In some implementations, the shipping management platform may determine the planned configuration of the plurality of packages in the cargo container, and the order in which to load the plurality of packages into the cargo container, based on the package information associated with the plurality of packages, based on container information associated with the cargo container, based on information associated with a planned route of the cargo container, and/or the like. For example, the shipping management platform may receive information specifying that the plurality of packages is to be loaded into the same cargo container, and accordingly may identify, based on the package information associated with the plurality of packages (e.g., the height, width, length, and weight dimensions for the plurality of packages), a cargo container that can accommodate the weight and size of the plurality of packages. As another example, the shipping management platform may receive information identifying a cargo container, and accordingly may select the plurality of packages (or a subset thereof), that will fit into the cargo container, based on a set of dimensions of the cargo container (e.g., height, width, and length dimensions of the cargo container), based on a weight limit associated with the cargo container (e.g., a maximum loading weight of the cargo container), based on a weight limit associated with a road, a bridge, and/or another type of travel medium on which the cargo container is expected to travel, based on the package information associated with the plurality of packages, and/or the like.

In some implementations, the shipping management platform may determine the planned configuration of the plurality of packages in the cargo container, and the order in which to load the plurality of packages into the cargo container, by iterating through hundreds or thousands of loading configurations and loading orders to identify the planned configuration of the plurality of packages in the cargo container, and the order in which to load the plurality of packages into the cargo container, that maximizes the spatial utilization of the cargo container and accommodates the one or more properties of the plurality of packages. For example, the shipping management platform may generate the planned configuration of the plurality of packages in the cargo container such that hazardous packages are grouped together and isolated from non-hazardous packages, such that fragile packages are located at or near the top of the cargo container, such that palletized packages are placed on stable surfaces, and/or the like.

In some implementations, once the loading configuration, loading the plurality of packages into the cargo container, has been generated, the shipping management platform may store (e.g., in the shipping information store, in the distributed ledger, and/or the like) shipment information associated with a shipment of the plurality of packages. The shipment information may include information identifying the cargo container in which the plurality of packages is to be loaded (e.g., a cargo container identifier, a cargo container serial number, and/or the like), information identifying the plurality of packages that is to be loaded into the cargo container, information identifying the loading configuration for loading the plurality of packages into the cargo container, and/or the like. Moreover, the shipping management platform may add, to the package information associated with each respective package included in the plurality of packages, information identifying a location, of the respective package, in the cargo container. In this way, the shipping management platform may provide the client device with information that identifies the location, in the cargo container, of a particular package, which increases the granularity of package tracking that can be provided to the user of the client device.

In this way, the shipping management platform may generate the loading configuration such that the spatial utilization of the cargo container is maximized, which decreases the need to make additional shipments of the cargo container, decreases the need to load and transport additional cargo containers to ship the plurality of packages, decreases the wear and tear on the cargo container and the additional cargo containers, decreases the complexity and cost of shipping logistics to load and transport the plurality of packages, and/or the like.

Turning to FIG. 1H, and as shown by reference number 116, the shipping management platform may transmit the shipment information, and the package information associated with the plurality of packages, to an AR device (e.g., the same AR device that was used to determine the plurality of dimensions for the plurality of packages, a different AR device, and/or the like). For example, the shipping management platform may transmit the shipment information and the package information based on receiving, from the AR device, a request for the shipment information and the package information, based on generating the loading configuration, and/or the like.

Figure 1I:
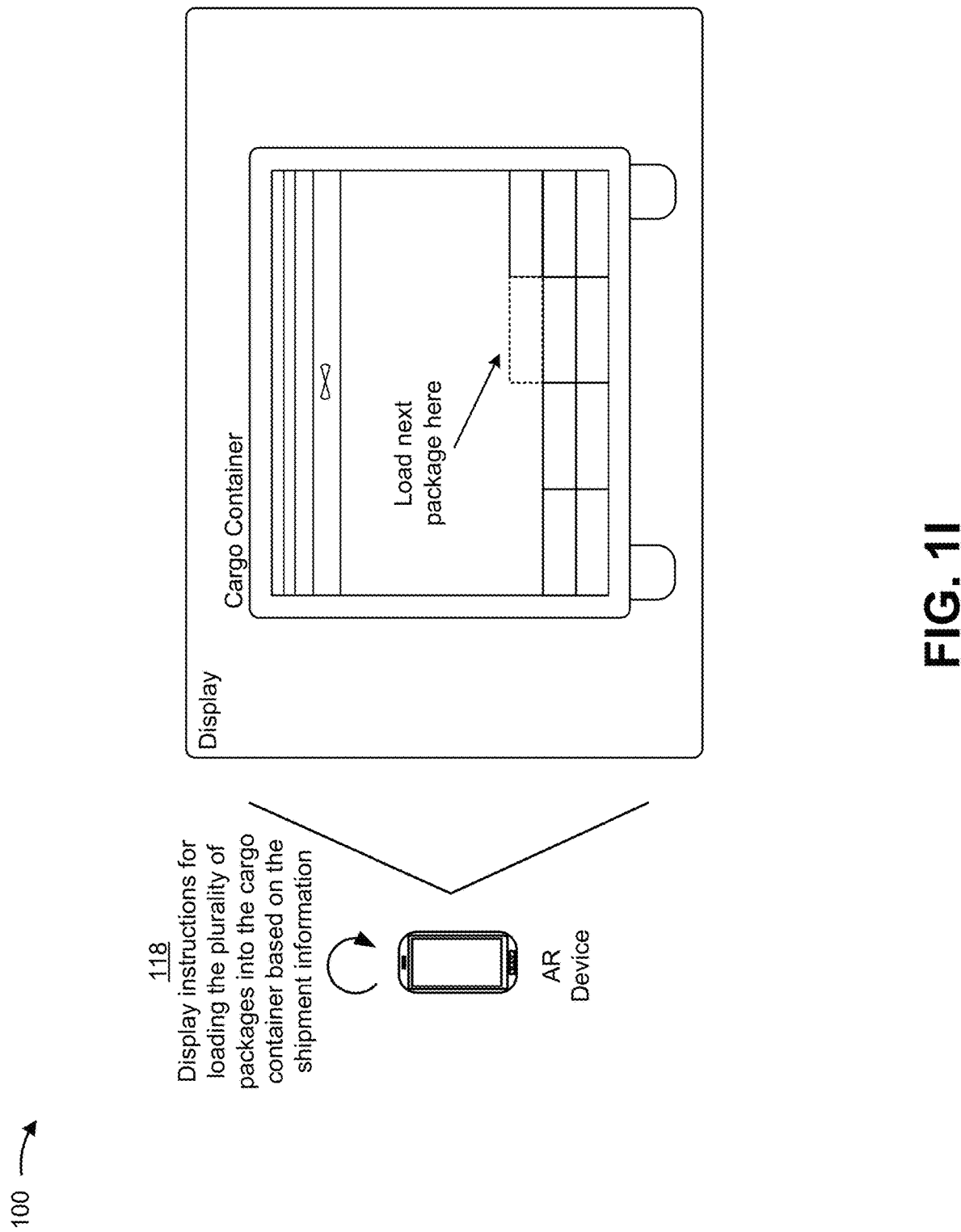

Turning to FIG. 1I, and as shown by reference number 118, the AR device may receive the shipment information and the package information associated with the plurality of packages, and may display various instructions (e.g., verbal instructions, augmented reality based instructions, and/or the like) on the display of the AR device, for loading the plurality of packages into the cargo container. For example, the AR device may display various instructions to guide a user of the AR device in loading the plurality of packages, into the cargo container, in the order specified in the loading configuration and according to the planned configuration of the plurality of packages in the cargo container that is specified by the loading configuration.

In some implementations, to guide the user of the AR device in loading the plurality of packages into the cargo container, the AR device may generate an instruction, for display on a display of the AR device, to scan a tag associated with a package of the plurality of packages (e.g., to scan a tag associated with the next package to be loaded into the cargo container according to the order specified by the loading configuration). The user may view the instruction on the display of the AR device, may locate the package based on viewing the instruction (e.g., may locate the package in a warehouse of the shipper, may locate the package in a storage room of the sender, may locate the package in a loading or staging area, and/or the like), and may scan the tag associated with the package to confirm that the user has obtained the correct package.

Based on verifying that the user has scanned the correct tag, the AR device may generate an instruction, for display on the display of the AR device, to load the package into the cargo container according to the loading configuration. For example, and as shown in FIG. 1I, the instruction may include an augmented reality overlay that is displayed over a view of the cargo container on the display of the AR device. The augmented reality overlay may visually indicate, to the user, a location, in the cargo container, where the package is to be located in the cargo container and an orientation, of the package, in which the package is to be oriented at the location in the cargo container. As an example, the augmented reality overlay may include a holographic outline, in the shape and orientation of the package, that is displayed at the location, in the cargo container, where the package is to be located in the cargo container. The user may follow the augmented reality overlay to place the package, in the cargo container, at the location and orientation visually indicated by the augmented reality overlay.

In some implementations, the AR device may determine whether the package has been loaded into the cargo container according to the loading configuration. For example, the AR device may use the camera and the depth camera, associated with the AR device, to verify that the package is located at the location in the cargo container where the package is to be located in the cargo container, to verify that the package is oriented in the orientation in which the package is to be oriented at the location in the cargo container, and/or the like. The AR device may verify that the package is located at the location in the cargo container where the package is to be located in the cargo container, and that the package is oriented in the orientation in which the package is to be oriented at the location in the cargo container, by verifying that the package has been loaded into the cargo container in a location and orientation that matches the augmented reality overlay of the holographic outline of the package (e.g., the location and the orientation is a 90% match of the augmented reality overlay of the holographic outline of the package, the location and the orientation is a 95% match of the augmented reality overlay of the holographic outline of the package, and/or the like).

In some implementations, the AR device may transmit, to the shipping management platform and based on determining that the package has been loaded into the cargo container according to the loading configuration, information indicating that the package has been loaded into the cargo container according to the loading configuration. The shipping management platform may store the information in the shipping information store, in the distributed ledger, and/or the like. The AR device may then proceed to display instructions for loading the remaining packages, of the plurality of packages, into the cargo container in a similar manner until all of the packages, in the plurality of packages, are loaded into the cargo container.

In this way, the AR device is capable of using augmented reality to assist a user in quickly and efficiently loading the cargo container. The AR device may generate various instructions, for display on a display of the AR device, to guide the user in locating a package to be loaded into the cargo container, to identify, based on the loading configuration, a location and orientation in which to load the package in the cargo container, and/or the like. In this way, the AR device may permit the cargo container to be loaded more quickly, more efficiently, and with fewer mistakes than loading the cargo container without the AR device.

In some implementations, instead of (or in addition to) transmitting the shipment information and the package information associated with the plurality of packages to an AR device, the shipping management platform may transmit the shipment information and the package information to an automated packaging loading device (or system), an automated pick and place system, an autonomous vehicle (e.g., an autonomous forklift, an autonomous crane, and/or the like). In this way, an automated package loading device may receive the shipment information and the package information, and may automatically load the plurality of packages into the cargo container, based on the order specified in the loading configuration and according to the planned configuration of the plurality of packages in the cargo container that is specified by the loading configuration.

Figure 1J:
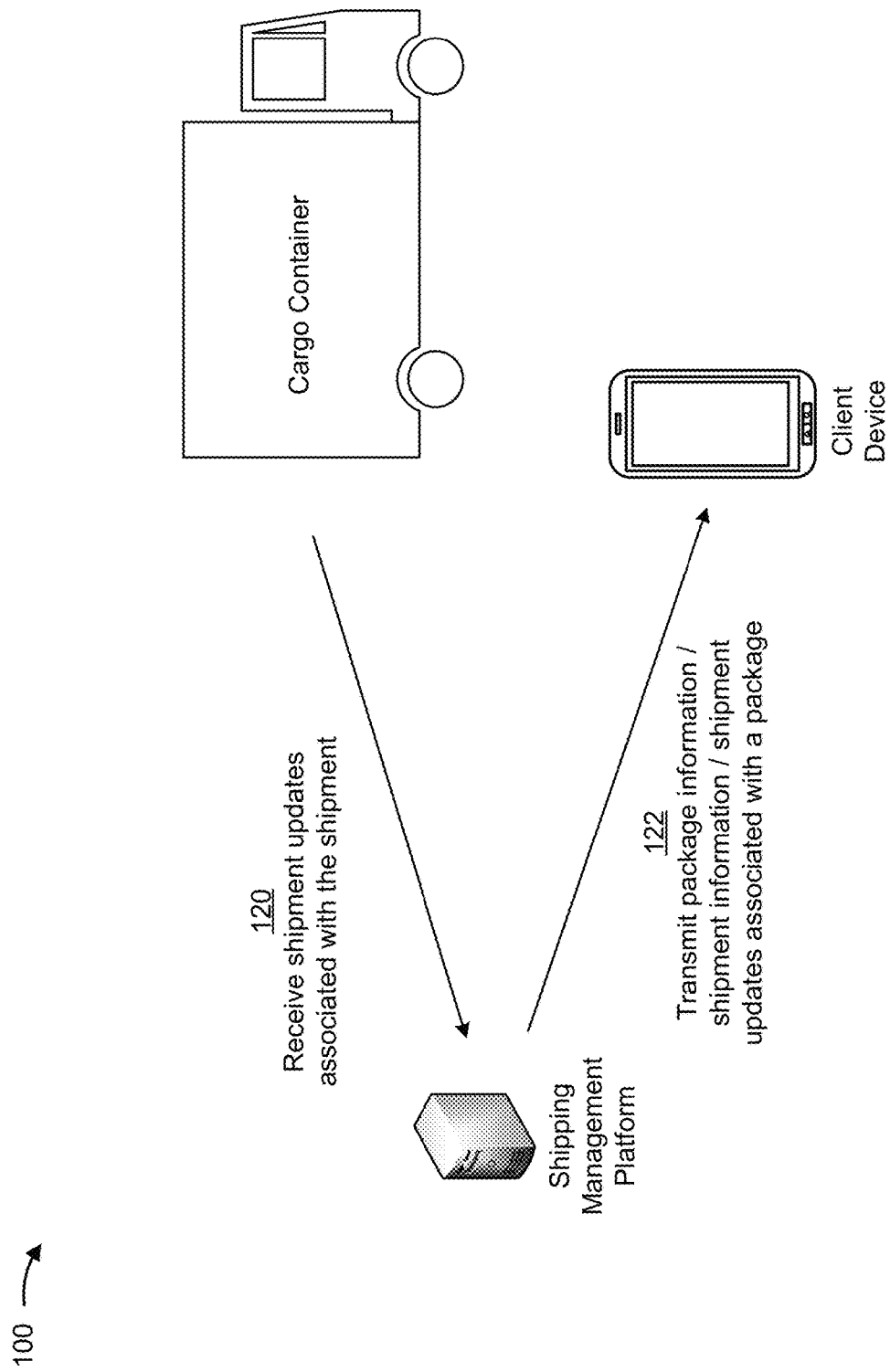

Turning to FIG. 1J, and as shown by reference number 120, the shipping management platform may receive shipment updates from a location device (e.g., a GPS device, a mobile device, and/or another type of device that is capable of providing location information associated with a cargo container) associated with the cargo container. For example, the location device may determine a location of the cargo container (e.g., periodically, based on receiving a request from the shipping management platform, and/or the like), may provide information identifying the location of the cargo container (e.g., information identifying world geodetic system (WGS) coordinates and/or location coordinates expressed in another coordinate system, information identifying a road on which the cargo container is traveling, information identifying a city, a state, a country, and/or the like, in which the cargo container is located, and/or the like), and/or the like. The shipping management platform may receive the shipment updates and may store information, associated with the shipment updates (e.g., information identifying the location of the cargo container, information identifying a date and time at which the location of the cargo container was obtained, and/or the like), in the shipping information store, in the distributed ledger, and/or the like.

As further shown in FIG. 1J, and by reference number 122, the shipping management platform may transmit various types of information to the client device (e.g., may push the information to the client device, may transmit the information based on receiving a request from the client device, and/or the like). For example, the shipping management platform may transmit package information, associated with a particular package, to the client device (e.g., information identifying a package identifier associated with the package, information identifying the plurality of dimensions of the package, and/or the like), may transmit shipment information, associated with the package, to the client device (e.g., information identifying a cargo container in which the package is loaded, information identifying a particular location of the package in the cargo container, and/or the like), may transmit shipment updates associated with the package (e.g., information identifying a location of the cargo container in which the package is loaded, information identifying one or more scans of a tag associated with the package, and/or the like), and/or the like. In some implementations, instead of (or in addition to) transmitting the package information, the shipment information, and/or the shipment updates to the client device, the shipping management platform may provide the client device with access to the shipping information store and/or the distributed ledger, and the client device may obtain the package information, the shipment information, and/or the shipment updates from the shipping information store and/or the distributed ledger.

As indicated above, FIGS. 1A-1J are provided merely as an example. Other examples may differ from what is described with regard to FIGS. 1A-1J.

Figure 2:
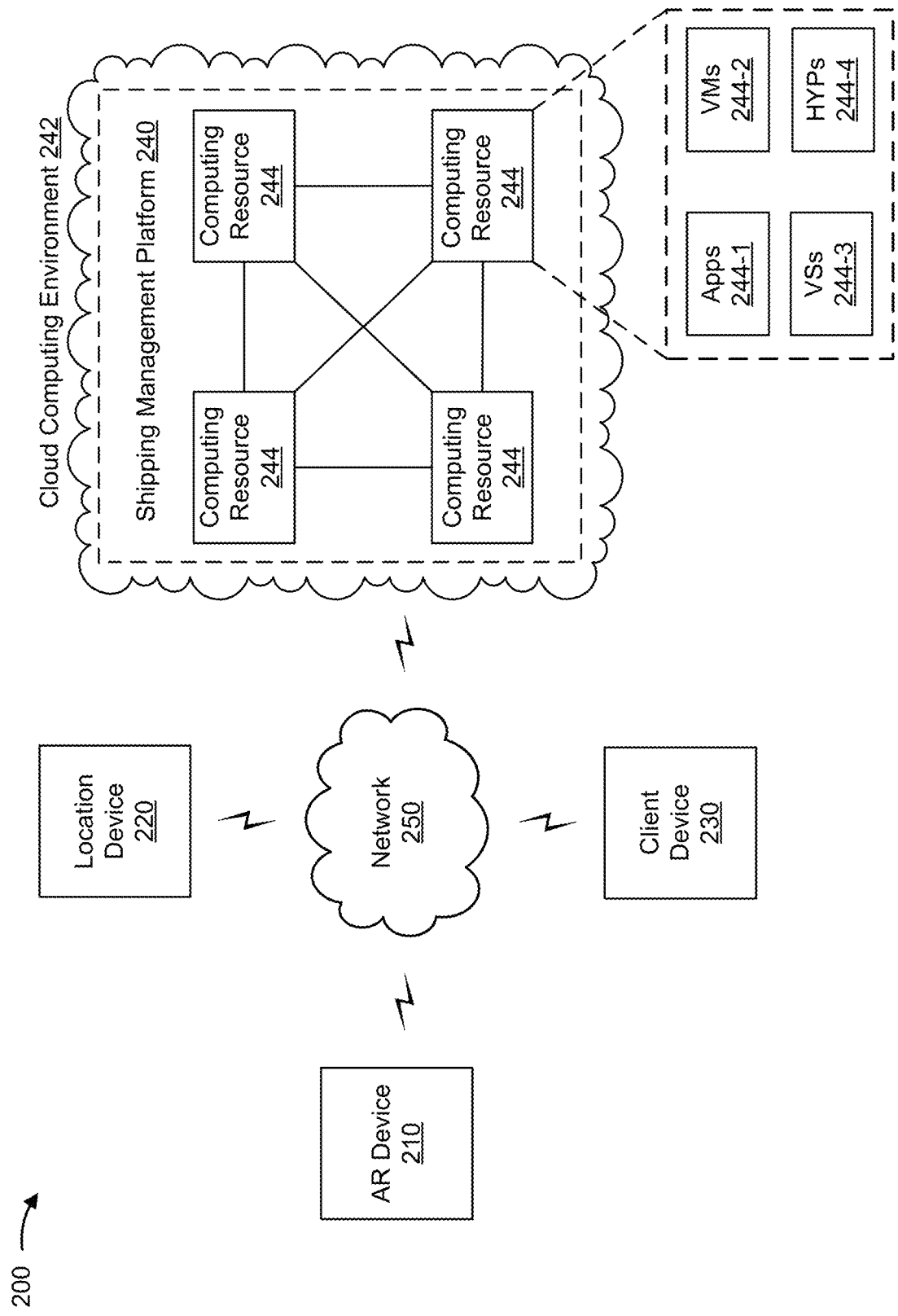
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include an AR device 210, a location device 220, a client device 230, a shipping management platform 240, a network 250, and/or the like. Devices of environment 200 may interconnect via wired connections, wireless connections, or a combination of wired and wireless connections.

AR device 210 includes one or more devices capable of receiving, generating, storing, processing, and/or providing information, such as information described herein. For example, AR device 210 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, a server device, an augmented reality system (e.g., a portable display that is communicatively connected with a backend server, computer, or platform that performs processing of AR content to be displayed on the display), and/or a similar type of device and/or system that is capable of generating and displaying augmented reality content.

In some implementations, AR device 210 may scan a tag associated with a package, may identify the package using a camera of AR device 210, may identify a plurality of corners of the package in the video feed, may automatically determine a plurality of dimensions of a package based on the plurality of corners identified by AR device 210, may transmit, to shipping management platform 240, information identifying the plurality of dimensions, and/or the like.

In some implementations, AR device 210 may receive, from shipping management platform 240, package information associated with a plurality of packages and shipment information that includes information identifying a cargo container and information identifying a loading configuration for loading the plurality of packages into the cargo container. In some implementations, AR device 210 may generate, based on receiving the package information and the shipment information, various instructions to be displayed in an augmented reality overlay on a display of the AR device 210, such as an instruction to scan a tag associated with a package of the plurality of packages, an instruction to load the package into the cargo container according to the loading configuration, and/or the like. In some implementations, AR device 210 may determine that the package has been loaded into the cargo container according to the loading configuration, and may transmit, to shipping management platform 240 based on determining that the package has been loaded into the cargo container according to the loading configuration, information indicating that the package has been loaded into the cargo container according to the loading configuration.

Location device 220 includes one or more devices capable of receiving, generating, storing, processing, and/or providing information, such as information described herein. For example, location device 220 may include a GPS device, a mobile device, and/or another type of device that is capable of providing location information associated with a cargo container. Location device 220 may determine a location of the cargo container (e.g., periodically, based on receiving a request from shipping management platform 240, and/or the like), may provide information identifying the location of the cargo container (e.g., information identifying world geodetic system (WGS) coordinates and/or location coordinates expressed in another coordinate system, information identifying a road on which the cargo container is traveling, information identifying a city, a state, a country, and/or the like, in which the cargo container is located, and/or the like), and/or the like.

Client device 230 includes one or more devices capable of receiving, generating, storing, processing, and/or providing information, such as information described herein. For example, client device 230 may include a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. In some implementations, client device 230 may receive, from shipping management platform 240 (e.g., periodically, based on transmitting a request to shipping management platform 240, and/or the like), package information associated with a package, shipment information associated with a shipment of the package, shipping updates associated with the package, and/or the like.

Shipping management platform 240 includes one or more devices capable of receiving, generating, storing, processing, and/or providing information, such as information described herein. In some implementations, shipping management platform 240 may include one or more devices capable of receiving, from AR device 210, package information associated with a plurality of packages. In some implementations, shipping management platform 240 may generate, based on the package information associated with the plurality of packages, a loading configuration for loading the plurality of packages into a cargo container, and may store the package information and shipment information in a shipping information store, in a distributed ledger, and/or the like. In some implementations, shipping management platform 240 may transmit the package information and the shipment information to AR device 210. In some implementations, shipping management platform 240 may receive location updates associated with the cargo container and may store information associated with the location updates in the shipping information store, in the distributed ledger, and/or the like.

In some implementations, shipping management platform 240 may be designed to be modular such that certain software components may be swapped in or out depending on a particular need. As such, shipping management platform 240 may be easily and/or quickly reconfigured for different uses. In some implementations, shipping management platform 240 may receive information from and/or transmit information to AR device 210, location device 220, and/or client device 230.

In some implementations, as shown, shipping management platform 240 may be hosted in a cloud computing environment 242. Notably, while implementations described herein describe shipping management platform 240 as being hosted in cloud computing environment 242, in some implementations, shipping management platform 240 may not be cloud-based (i.e., may be implemented outside of a cloud computing environment) or may be partially cloud-based. Cloud computing environment 242 includes an environment that hosts shipping management platform 240. Cloud computing environment 242 may provide computation, software, data access, storage, etc., services that do not require end-user knowledge of a physical location and configuration of system(s) and/or device(s) that hosts shipping management platform 240. As shown, cloud computing environment 242 may include a group of computing resources 244 (referred to collectively as "computing resources 244" and individually as "computing resource 244").

Computing resource 244 includes one or more personal computers, workstation computers, server devices, or other types of computation and/or communication devices. In some implementations, computing resource 244 may host shipping management platform 240. The cloud resources may include compute instances executing in computing resource 244, storage devices provided in computing resource 244, data transfer devices provided by computing resource 244, etc. In some implementations, computing resource 244 may communicate with other computing resources 244 via wired connections, wireless connections, or a combination of wired and wireless connections.

As further shown in FIG. 2, computing resource 244 includes a group of cloud resources, such as one or more applications ("APPs") 244-1, one or more virtual machines ("VMs") 244-2, virtualized storage ("VSs") 244-3, one or more hypervisors ("HYPs") 244-4, and/or the like.

Application 244-1 includes one or more software applications that may be provided to or accessed by AR device 210, location device 220, and/or client device 230. Application 244-1 may eliminate a need to install and execute the software applications on AR device 210, location device 220, and/or client device 230. For example, application 244-1 may include software associated with shipping management platform 240 and/or any other software capable of being provided via cloud computing environment 242. In some implementations, one application 244-1 may send/receive information to/from one or more other applications 244-1, via virtual machine 244-2.

Virtual machine 244-2 includes a software implementation of a machine (e.g., a computer) that executes programs like a physical machine. Virtual machine 244-2 may be either a system virtual machine or a process virtual machine, depending upon use and degree of correspondence to any real machine by virtual machine 244-2. A system virtual machine may provide a complete system platform that supports execution of a complete operating system ("OS"). A process virtual machine may execute a single program, and may support a single process. In some implementations, virtual machine 244-2 may execute on behalf of a user (e.g., a user of AR device 210, location device 220, or client device 230, or an operator of shipping management platform 240), and may manage infrastructure of cloud computing environment 242, such as data management, synchronization, or long-duration data transfers.

Virtualized storage 244-3 includes one or more storage systems and/or one or more devices that use virtualization techniques within the storage systems or devices of computing resource 244. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 244-4 may provide hardware virtualization techniques that allow multiple operating systems (e.g., "guest operating systems") to execute concurrently on a host computer, such as computing resource 244. Hypervisor 244-4 may present a virtual operating platform to the guest operating systems, and may manage the execution of the guest operating systems. Multiple instances of a variety of operating systems may share virtualized hardware resources.

Network 250 includes one or more wired and/or wireless networks. For example, network 250 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, and/or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
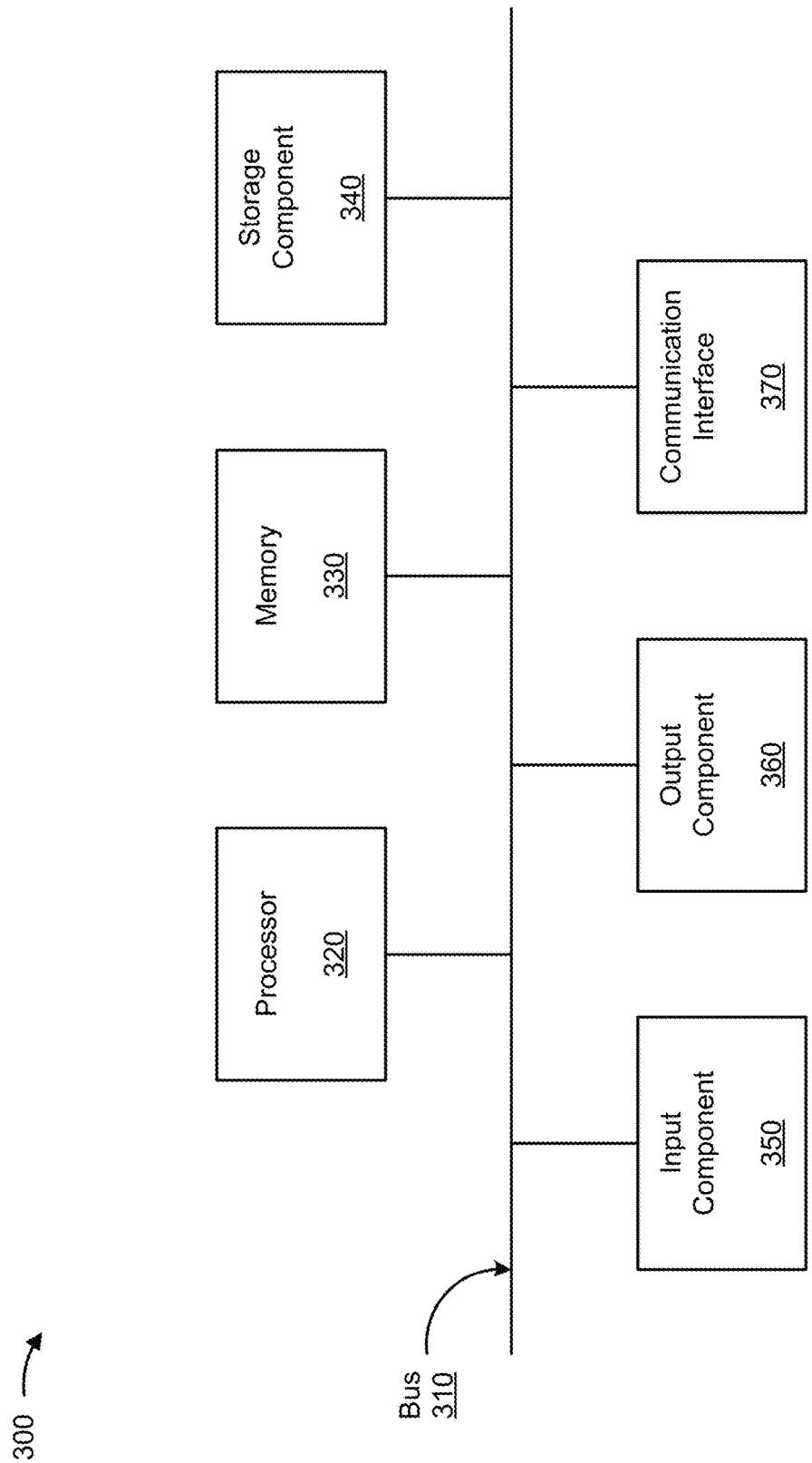
FIG. 3 is a diagram of example components of one or more devices of FIG. 2.

FIG. 3 is a diagram of example components of a device 300. Device 300 may correspond to AR device 210, location device 220, client device 230, shipping management platform 240, computing resource 244, and/or one or more devices included in network 250. In some implementations, AR device 210, location device 220, client device 230, shipping management platform 240, computing resource 244, and/or one or more devices included in network 250 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 includes a component that permits communication among the components of device 300. Processor 320 is implemented in hardware, firmware, or a combination of hardware and software. Processor 320 takes the form of a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 320 includes one or more processors capable of being programmed to perform a function. Memory 330 includes a random access memory (RAM), a read only memory (ROM), and/or another type of dynamic or static storage device (e.g., a flash memory, a magnetic memory, and/or an optical memory) that stores information and/or instructions for use by processor 320.

Storage component 340 stores information and/or software related to the operation and use of device 300. For example, storage component 340 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

Input component 350 includes a component that permits device 300 to receive information, such as via user input (e.g., a touch screen display, a keyboard, a keypad, a mouse, a button, a switch, and/or a microphone). Additionally, or alternatively, input component 350 may include a sensor for sensing information (e.g., a global positioning system (GPS) component, an accelerometer, a gyroscope, and/or an actuator). Output component 360 includes a component that provides output information from device 300 (e.g., a display, a speaker, and/or one or more light-emitting diodes (LEDs)).

Communication interface 370 includes a transceiver-like component (e.g., a transceiver and/or a separate receiver and transmitter) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes based on processor 320 executing software instructions stored by a non-transitory computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
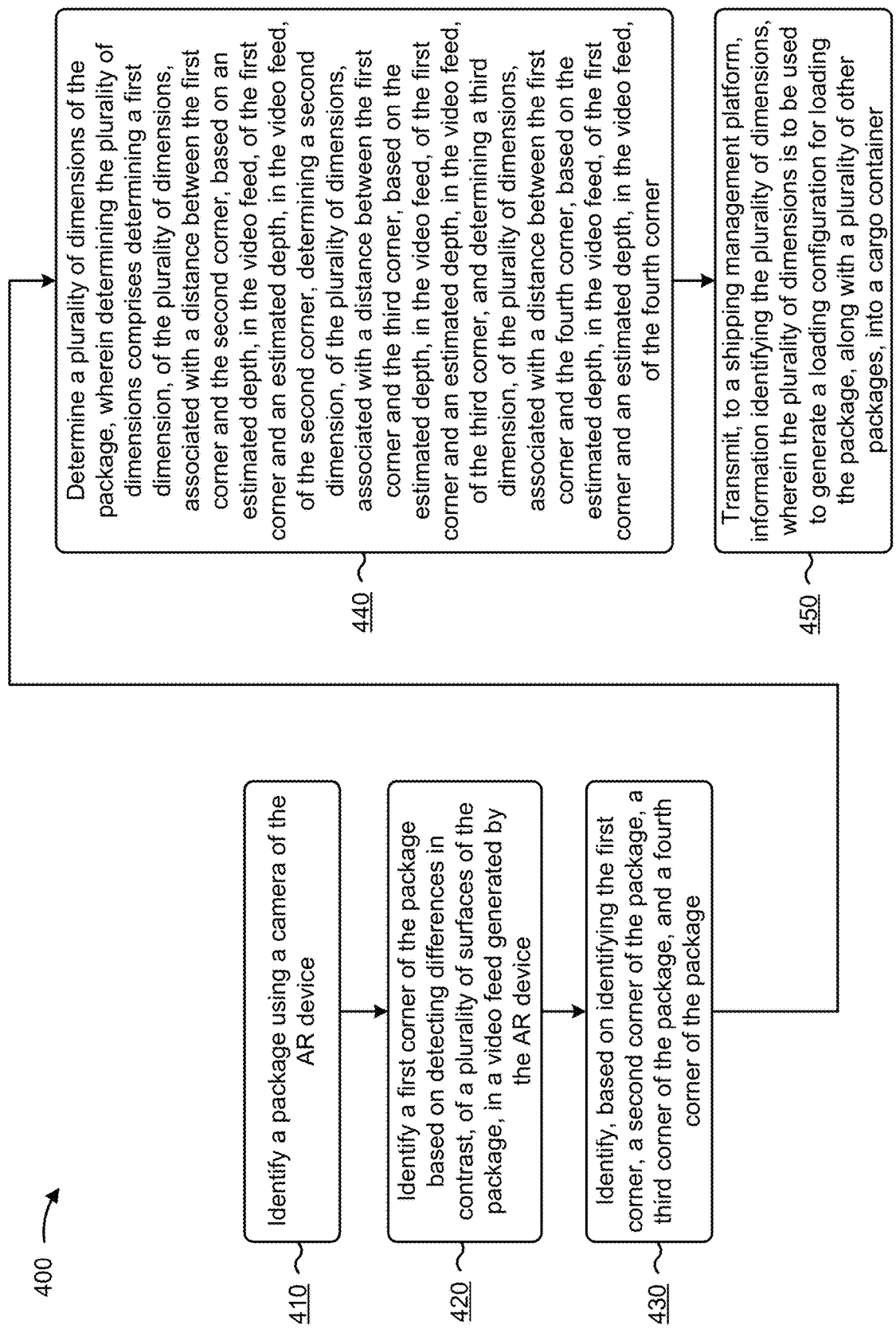
FIGS. 4-6 are flow charts of example processes for augmented reality enabled cargo loading optimization.

FIG. 4 is a flow chart of an example process 400 for augmented reality enabled cargo loading optimization. In some implementations, one or more process blocks of FIG. 4 may be performed by an AR device (e.g., AR device 210). In some implementations, one or more process blocks of FIG. 4 may be performed by another device or a group of devices separate from or including the AR device, such as a location device (e.g., location device 220), a client device (e.g., client device 230), a shipping management platform (e.g., shipping management platform 240), and/or one or more devices included in a network (e.g., network 250).

As shown in FIG. 4, process 400 may include identifying a package using a camera of the AR device (block 410). For example, the AR device (e.g., using processor 320, memory 330, storage component 340, input component 350, output component 360, communication interface 370, and/or the like) may identify a package in a video using a camera of the AR device, as described above.

As further shown in FIG. 4, process 400 may include identifying a first corner of the package based on detecting differences in contrast, of a plurality of surfaces of the package, in a video feed generated by the AR device (block 420). For example, the AR device (e.g., using processor 320, memory 330, storage component 340, input component 350, output component 360, communication interface 370, and/or the like) may identify a first corner of the package based on detecting differences in contrast, of a plurality of surfaces of the package, in a video feed generated by the AR device, as described above.

As further shown in FIG. 4, process 400 may include identifying, based on identifying the first corner, a second corner of the package, a third corner of the package, and a fourth corner of the package (block 430). For example, the AR device (e.g., using processor 320, memory 330, storage component 340, input component 350, output component 360, communication interface 370, and/or the like) may identify, based on identifying the first corner, a second corner of the package, a third corner of the package, and a fourth corner of the package, as described above.

As further shown in FIG. 4, process 400 may include determining a plurality of dimensions of the package, wherein determining the plurality of dimensions comprises determining a first dimension, of the plurality of dimensions, associated with a distance between the first corner and the second corner, based on an estimated depth, in the video feed, of the first corner and an estimated depth, in the video feed, of the second corner, determining a second dimension, of the plurality of dimensions, associated with a distance between the first corner and the third corner, based on the estimated depth, in the video feed, of the first corner and an estimated depth, in the video feed, of the third corner, and determining a third dimension, of the plurality of dimensions, associated with a distance between the first corner and the fourth corner, based on the estimated depth, in the video feed, of the first corner and an estimated depth, in the video feed, of the fourth corner (block 440). For example, the AR device (e.g., using processor 320, memory 330, storage component 340, input component 350, output component 360, communication interface 370, and/or the like) may determine a plurality of dimensions of the package, as described above. In some implementations, determining the plurality of dimensions comprises determining a first dimension, of the plurality of dimensions, associated with a distance between the first corner and the second corner, based on an estimated depth, in the video feed, of the first corner and an estimated depth, in the video feed, of the second corner, determining a second dimension, of the plurality of dimensions, associated with a distance between the first corner and the third corner, based on the estimated depth, in the video feed, of the first corner and an estimated depth, in the video feed, of the third corner, and determining a third dimension, of the plurality of dimensions, associated with a distance between the first corner and the fourth corner, based on the estimated depth, in the video feed, of the first corner and an estimated depth, in the video feed, of the fourth corner.

As further shown in FIG. 4, process 400 may include transmitting, to a shipping management platform, information identifying the plurality of dimensions, wherein the plurality of dimensions is to be used to generate a loading configuration for loading the package, along with a plurality of other packages, into a cargo container (block 450). For example, the AR device (e.g., using processor 320, memory 330, storage component 340, input component 350, output component 360, communication interface 370, and/or the like) may transmit, to a shipping management platform, information identifying the plurality of dimensions, wherein the plurality of dimensions is to be used to generate a loading configuration for loading the package, along with a plurality of other packages, into a cargo container, as described above.

Process 400 may include additional implementations, such as any single implementation or any combination of implementations described below and/or in connection with one or more other processes described elsewhere herein.

In some implementations, when identifying the first corner, the AR device may perform blurring of a background portion of the video feed to isolate the package from the background portion. In some implementations, the AR device may scan a tag, associated with the package, to obtain information associated with the tag, and transmit, to the shipping management platform, the information identifying the plurality of dimensions of the package and information associating the information associated with the tag and the information identifying the plurality of dimensions of the package.

In some implementations, the AR device may display, on a display of the AR device, a plurality of visual indicators that are associated with a plurality of regions of the video feed, and when identifying the second corner of the package, the third corner of the package, and the fourth corner of the package, the AR device may identify, based at least in part on the plurality of regions of the video feed, the second corner of the package, the third corner of the package, and the fourth corner of the package. In some implementations, when identifying the second corner of the package, the third corner of the package, and the fourth corner of the package, the AR device may identify the second corner of the package based on the second corner of the package being located in a first region of the video feed, identify the third corner of the package based on the third corner of the package being located in a second region of the video feed, and identify the fourth corner of the package based on the fourth corner of the package being located in a third region of the video feed.

In some implementations, when determining the first dimension, the AR device may determine a point, included in a point cloud associated with the video feed, associated with the first corner, determine a point, included in the point cloud, associated with the second corner, and determine the first dimension based on a distance, in the point cloud, between the point associated with the first corner and the point associated with the second corner.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Figure 5:
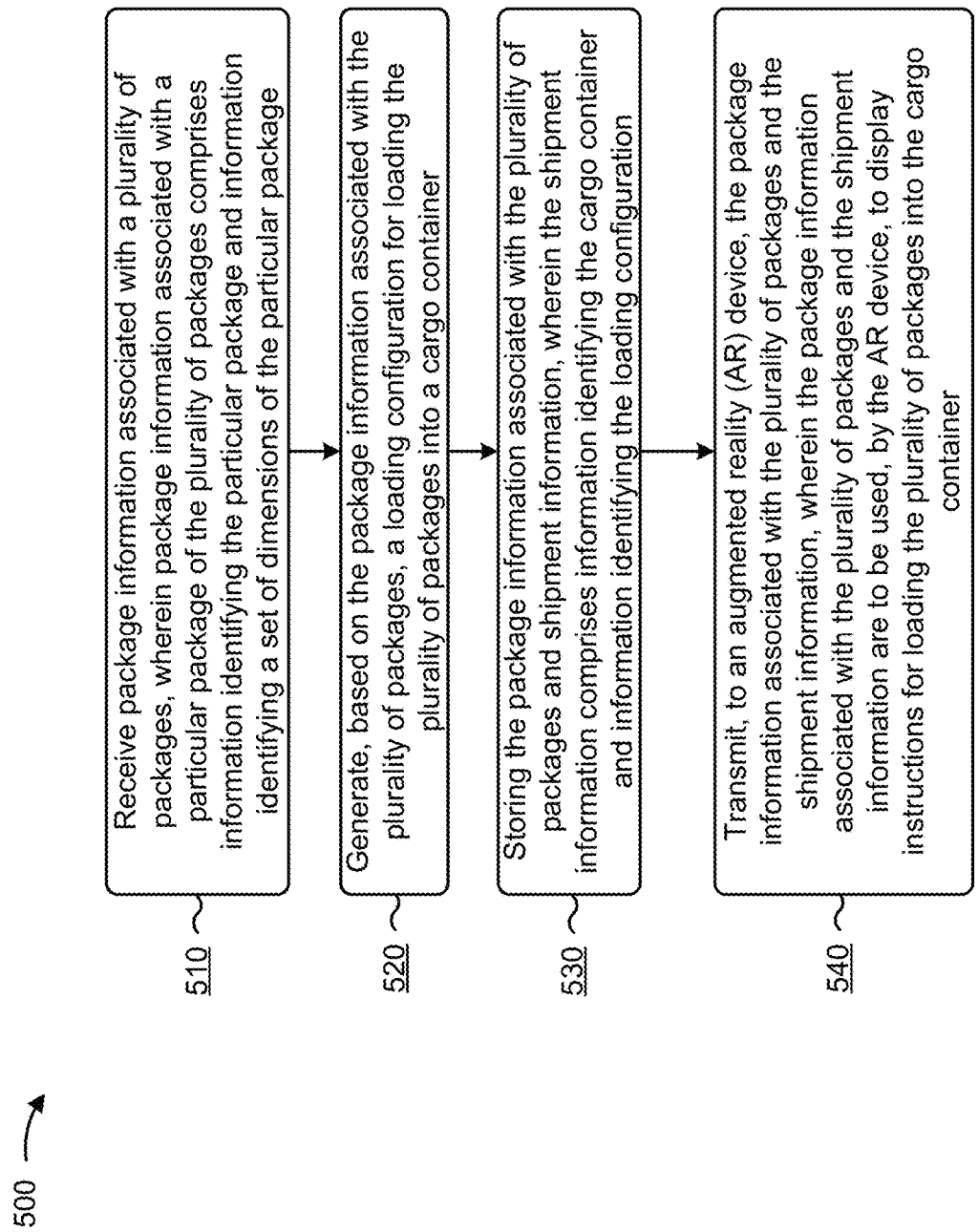

FIG. 5 is a flow chart of an example process 500 for augmented reality enabled cargo loading optimization. In some implementations, one or more process blocks of FIG. 5 may be performed by a shipping management platform (e.g., shipping management platform 240). In some implementations, one or more process blocks of FIG. 5 may be performed by another device or a group of devices separate from or including the shipping management platform, such as an AR device (e.g., AR device 210), a location device (e.g., location device 220), a client device (e.g., client device 230), and/or one or more devices included in a network (e.g., network 250).

As shown in FIG. 5, process 500 may include receiving package information associated with a plurality of packages, wherein package information associated with a particular package of the plurality of packages comprises information identifying the particular package and information identifying a set of dimensions of the particular package (block 510). For example, the shipping management platform (e.g., using computing resource 244, processor 320, memory 330, storage component 340, input component 350, output component 360, communication interface 370, and/or the like) may receive package information associated with a plurality of packages, as described above. In some implementations, package information associated with a particular package of the plurality of packages comprises information identifying the particular package and information identifying a set of dimensions of the particular package.

As further shown in FIG. 5, process 500 may include generating, based on the package information associated with the plurality of packages, a loading configuration for loading the plurality of packages into a cargo container (block 520). For example, the shipping management platform (e.g., using computing resource 244, processor 320, memory 330, storage component 340, input component 350, output component 360, communication interface 370, and/or the like) may generate, based on the package information associated with the plurality of packages, a loading configuration for loading the plurality of packages into a cargo container, as described above.

As further shown in FIG. 5, process 500 may include storing the package information associated with the plurality of packages and shipment information, wherein the shipment information comprises information identifying the cargo container and information identifying the loading configuration (block 530). For example, the shipping management platform (e.g., using computing resource 244, processor 320, memory 330, storage component 340, input component 350, output component 360, communication interface 370, and/or the like) may store the package information associated with the plurality of packages and shipment information, as described above. In some implementations, the shipment information comprises information identifying the cargo container and information identifying the loading configuration.

As further shown in FIG. 5, process 500 may include transmitting, to an augmented reality (AR) device, the package information associated with the plurality of packages and the shipment information, wherein the package information associated with the plurality of packages and the shipment information are to be used, by the AR device, to display instructions for loading the plurality of packages into the cargo container (block 540). For example, the shipping management platform (e.g., using computing resource 244, processor 320, memory 330, storage component 340, input component 350, output component 360, communication interface 370, and/or the like) may transmit, to an augmented reality (AR) device, the package information associated with the plurality of packages and the shipment information, as described above. In some implementations, the package information associated with the plurality of packages and the shipment information are to be used, by the AR device, to display instructions for loading the plurality of packages into the cargo container.

Process 500 may include additional implementations, such as any single implementation or any combination of implementations described below and/or in connection with one or more other processes described elsewhere herein.

In some implementations, the loading configuration comprises information identifying a planned configuration, of the plurality of packages, in the cargo container and information identifying an order in which to load the plurality of packages into the cargo container. In some implementations, when generating the loading configuration for loading the plurality of packages into the cargo container, the shipping management platform may generate the loading configuration based on a set of dimensions of the cargo container and a plurality of respective sets of dimensions for the plurality of packages.

In some implementations, a subset of packages, of the plurality of packages, is a palletized set of packages and, when generating the loading configuration for loading the plurality of packages into the cargo container, the shipping management platform may generate, based on the subset of packages being the palletized set of packages, a planned configuration, of the plurality of packages, in the cargo container. In some implementations, one or more packages, of the plurality of packages, are fragile packages and, when generating the loading configuration for loading the plurality of packages into the cargo container, the shipping management platform may generate, based on the one or more packages being fragile packages, a planned configuration, of the plurality of packages, in the cargo container.

In some implementations, the package information associated with the plurality of packages comprises a plurality of respective weights for the plurality of packages and, when generating the loading configuration for loading the plurality of packages into the cargo container comprises, the shipping management platform may generate the loading configuration based on the plurality of respective weights for the plurality of packages and at least one of a weight limit associated with a road on which the cargo container is expected to travel, a weight limit associated with the cargo container, or a weight distribution parameter associated with the cargo container.

In some implementations, the package information, associated with the particular package of the plurality of packages, comprises information identifying a location, of the particular package, in the cargo container, and the shipping management platform may receive, from a location device associated with the cargo container, a shipping update that identifies a location of the cargo container, receive, from a client device, a request associated with the particular package, and transmit, to the client device and based on receiving the request, the information identifying the particular package, and the information identifying the location, of the particular package, in the cargo container, and information identifying the location of the cargo container.

In some implementations, when storing the package information associated with the plurality of packages, the shipping management platform may generate a package identifier for the particular package of the plurality of packages, store, in an electronic file, the package identifier and the package information associated with the particular package, generate a hash for the electronic file, and store the hash in a distributed ledger.

Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Figure 6:
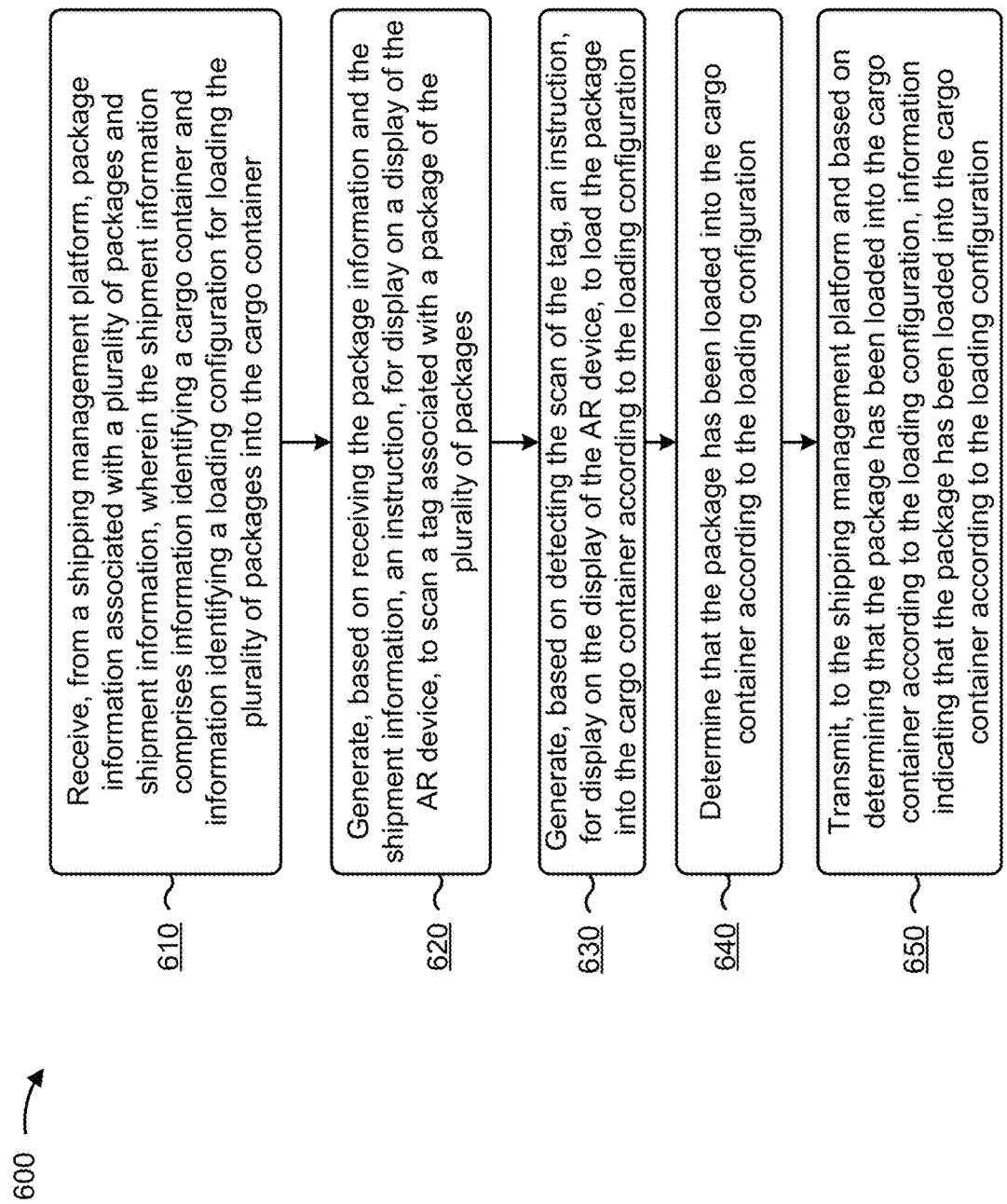

FIG. 6 is a flow chart of an example process 600 for augmented reality enabled cargo loading optimization. In some implementations, one or more process blocks of FIG. 6 may be performed by an AR device (e.g., AR device 210). In some implementations, one or more process blocks of FIG. 6 may be performed by another device or a group of devices separate from or including the AR device, such as a location device (e.g., location device 220), a client device (e.g., client device 230), a shipping management platform (e.g., shipping management platform 240), and/or one or more devices included in a network (e.g., network 250).

As shown in FIG. 6, process 600 may include receiving, from a shipping management platform, package information associated with a plurality of packages and shipment information, wherein the shipment information comprises information identifying a cargo container and information identifying a loading configuration for loading the plurality of packages into the cargo container (block 610). For example, the AR device (e.g., using processor 320, memory 330, storage component 340, input component 350, output component 360, communication interface 370, and/or the like) may receive, from a shipping management platform, package information associated with a plurality of packages and shipment information, as described above. In some implementations, the shipment information comprises information identifying a cargo container and information identifying a loading configuration for loading the plurality of packages into the cargo container.

As further shown in FIG. 6, process 600 may include generating, based on receiving the package information and the shipment information, an instruction, for display on a display of the AR device, to scan a tag associated with a package of the plurality of packages (block 620). For example, the AR device (e.g., using processor 320, memory 330, storage component 340, input component 350, output component 360, communication interface 370, and/or the like) may generate, based on receiving the package information and the shipment information, an instruction, for display on a display of the AR device, to scan a tag associated with a package of the plurality of packages, as described above.

As further shown in FIG. 6, process 600 may include generating, based on detecting the scan of the tag, an instruction, for display on the display of the AR device, to load the package into the cargo container according to the loading configuration (block 630). For example, the AR device (e.g., using processor 320, memory 330, storage component 340, input component 350, output component 360, communication interface 370, and/or the like) may generate, based on detecting the scan of the tag, an instruction, for display on the display of the AR device, to load the package into the cargo container according to the loading configuration, as described above.

As further shown in FIG. 6, process 600 may include determining that the package has been loaded into the cargo container according to the loading configuration (block 640). For example, the AR device (e.g., using processor 320, memory 330, storage component 340, input component 350, output component 360, communication interface 370, and/or the like) may determine that the package has been loaded into the cargo container according to the loading configuration, as described above.

As further shown in FIG. 6, process 600 may include transmitting, to the shipping management platform and based on determining that the package has been loaded into the cargo container according to the loading configuration, information indicating that the package has been loaded into the cargo container according to the loading configuration (block 650). For example, the AR device (e.g., using processor 320, memory 330, storage component 340, input component 350, output component 360, communication interface 370, and/or the like) may transmit, to the shipping management platform and based on determining that the package has been loaded into the cargo container according to the loading configuration, information indicating that the package has been loaded into the cargo container according to the loading configuration, as described above.

Process 600 may include additional implementations, such as any single implementation or any combination of implementations described below and/or in connection with one or more other processes described elsewhere herein.

In some implementations, the instruction to load the package into the cargo container according to the loading configuration visually indicates a location, in the cargo container, where the package is to be located in the cargo container, and an orientation, of the package, in which the package is to be oriented at the location in the cargo container. In some implementations, when determining that the package has been loaded into the cargo container according to the loading configuration, the AR device may verify that the package is located at the location in the cargo container where the package is to be located in the cargo container, and verify that the package is oriented in the orientation in which the package is to be oriented at the location in the cargo container.

In some implementations, the loading configuration comprises information identifying a planned configuration, of the plurality of packages, in the cargo container, and, when generating the instruction to load the package into the cargo container, the AR device may generate the instruction to load the package into the cargo container based on the planned configuration, of the plurality of packages, in the cargo container. In some implementations, the loading configuration comprises information identifying an order in which to load the plurality of packages into the cargo container, and when generating the instruction to scan the tag associated with the package, the AR device may generate the instruction to scan the tag, associated with the package, based on the package being a next package, to load into the cargo container, in the order in which to load the plurality of packages into the cargo container.

Although FIG. 6 shows example blocks of process 600, in some implementations, process 600 may include additional blocks, fewer blocks, different blocks, or differently arranged blocks than those depicted in FIG. 6. Additionally, or alternatively, two or more of the blocks of process 600 may be performed in parallel.

The foregoing disclosure provides illustration and description, but is not intended to be exhaustive or to limit the implementations to the precise form disclosed. Modifications and variations may be made in light of the above disclosure or may be acquired from practice of the implementations.

As used herein, the term "component" is intended to be broadly construed as hardware, firmware, and/or a combination of hardware and software.

Certain user interfaces have been described herein and/or shown in the figures. A user interface may include a graphical user interface, a non-graphical user interface, a text-based user interface, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be pre-configured to a standard configuration, a specific configuration based on a type of device on which the user interface is displayed, and/or a set of configurations based on capabilities and/or specifications associated with a device on which the user interface is displayed.

It will be apparent that systems and/or methods described herein, may be implemented in different forms of hardware, firmware, and/or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An augmented reality (AR) device, comprising:
one or more memories; and
one or more processors, communicatively coupled to the one or more memories, to:
identify a package using a camera of the AR device;
identify a first corner of the package based on detecting differences in contrast, of a plurality of surfaces of the package, in a video feed generated by the AR device;
identify, based on identifying the first corner:
a second corner of the package,
wherein the one or more processors, when identifying the second corner of the package, are to:
determine, beginning at a location of the first corner, an edge by identifying a portion of the package, near the first corner, where two contrast gradients meet,
traverse along the edge until a boundary between the package and a background of the video feed is reached, and
identify, using the boundary, the second corner,
a third corner of the package, and
a fourth corner of the package;
determine a plurality of dimensions of the package,
wherein the one or more processors, when determining the plurality of dimensions, are to:
determine a first dimension, of the plurality of dimensions, associated with a distance between the first corner and the second corner, based on:
an estimated depth, in the video feed, of the first corner, and
an estimated depth, in the video feed, of the second corner,
determine a second dimension, of the plurality of dimensions, associated with a distance between the first corner and the third corner, based on:
the estimated depth, in the video feed, of the first corner, and
an estimated depth, in the video feed, of the third corner, and
determine a third dimension, of the plurality of dimensions, associated with a distance between the first corner and the fourth corner, based on:
the estimated depth, in the video feed, of the first corner, and
an estimated depth, in the video feed, of the fourth corner; and
transmit, to a shipping management platform, information identifying the plurality of dimensions,
wherein the plurality of dimensions is to be used to generate a loading configuration for loading the package, along with a plurality of other packages, into a cargo container.

2. The AR device of claim 1, wherein the one or more processors, when identifying the first corner, are to:
perform blurring of a background portion of the video feed to isolate the package from the background portion.

3. The AR device of claim 1, wherein the one or more processors are further to:
scan a tag, associated with the package, to obtain information associated with the tag; and
transmit, to the shipping management platform:
the information identifying the plurality of dimensions of the package, and
information associating the information associated with the tag and the information identifying the plurality of dimensions of the package.

4. The AR device of claim 1, wherein the one or more processors are further to:
display, on a display of the AR device, a plurality of visual indicators that are associated with a plurality of regions of the video feed.

5. The AR device of claim 4, wherein the one or more processors, when identifying the second corner of the package, the third corner of the package, and the fourth corner of the package, are to:
identify, based at least in part on the plurality of regions of the video feed, the second corner of the package, the third corner of the package, and the fourth corner of the package.

6. The AR device of claim 1, wherein the one or more processors, when identifying the second corner of the package, the third corner of the package, and the fourth corner of the package, are to:
identify the third corner of the package based on the third corner of the package being located in a second region of the video feed; and identify the fourth corner of the package based on the fourth corner of the package being located in a third region of the video feed.

7. The AR device of claim 1, wherein the one or more processors, when determining the first dimension, are to:
  determine a point, included in a point cloud, associated with the second corner; and
  determine the first dimension based on a distance, in the point cloud, between the point associated with the first corner and the point associated with the second corner.

8. A non-transitory computer-readable medium storing instructions, the instructions comprising:
  one or more instructions that, when executed by one or more processors of an augmented reality (AR) device, cause the one or more processors to:
  identify a package using a camera of the AR device;
  identify a first corner of the package based on detecting differences in contrast, of a plurality of surfaces of the package, in a video feed generated by the AR device;
  identify, based on identifying the first corner:
    a second corner of the package,
      wherein the one or more instructions, that cause the one or more processors to identify the second corner of the package, cause the one or more processors to:
        determine, beginning at a location of the first corner, an edge by identifying a portion of the package, near the first corner, where two contrast gradients meet,
        traverse along the edge until a boundary between the package and a background of the video feed is reached, and
        identify, using the boundary, the second corner,
    a third corner of the package, and
    a fourth corner of the package;
  determine a plurality of dimensions of the package;
  transmit, to a shipping management platform, information identifying the plurality of dimensions,
  receive, from the shipping management platform:
    package information associated with a plurality of packages, and shipment information,
      wherein the shipment information comprises:
        information identifying a cargo container, and
        information identifying a loading configuration for loading the plurality of packages into the cargo container,
          wherein the loading configuration comprises:
          information identifying an order in which to load the plurality of packages into the cargo container based on:
            a plurality of respective sets of dimensions for the plurality of packages including at least height dimensions and weight dimensions for the plurality of packages, and
            a set of dimensions of the cargo container and a weight limit associated with the cargo container;
  generate, based on receiving the package information and the shipment information, an instruction, for display on a display of the AR device, to scan a tag associated with a package of the plurality of packages;
  generate, based on detecting the scan of the tag, an instruction, for display on the display of the AR device, to load the package into the cargo container according to the loading configuration;
  determine that the package has been loaded into the cargo container according to the loading configuration; and
  transmit, to the shipping management platform and based on determining that the package has been loaded into the cargo container according to the loading configuration, information indicating that the package has been loaded into the cargo container according to the loading configuration.

9. The non-transitory computer-readable medium of claim 8, wherein the instruction to load the package into the cargo container according to the loading configuration visually indicates:
  a location, in the cargo container, where the package is to be located in the cargo container, and
  an orientation, of the package, in which the package is to be oriented at the location in the cargo container.

10. The non-transitory computer-readable medium of claim 9, wherein the one or more instructions, that cause the one or more processors to determine that the package has been loaded into the cargo container according to the loading configuration, cause the one or more processors to:
  verify that the package is located at the location in the cargo container where the package is to be located in the cargo container; and
  verify that the package is oriented in the orientation in which the package is to be oriented at the location in the cargo container.

11. The non-transitory computer-readable medium of claim 8, wherein the loading configuration comprises:
  information identifying a planned configuration, of the plurality of packages, in the cargo container, and
  wherein the one or more instructions, that cause the one or more processors to generate the instruction to load the package into the cargo container, cause the one or more processors to:
    generate the instruction to load the package into the cargo container based on the planned configuration, of the plurality of packages, in the cargo container.

12. The non-transitory computer-readable medium of claim 8, wherein the loading configuration comprises:
  information identifying an order in which to load the plurality of packages into the cargo container; and
  wherein the one or more instructions, that cause the one or more processors to generate the instruction to scan the tag associated with the package, cause the one or more processors to:
    generate the instruction to scan the tag, associated with the package, based on the package being a next package, to load into the cargo container, in the order in which to load the plurality of packages into the cargo container.

13. The non-transitory computer-readable medium of claim 8, wherein the one or more instructions, that cause the one or more processors to determine the plurality of dimensions of the package, cause the one or more processors to:
  determine a first dimension, of the plurality of dimensions, associated with a distance between the first corner and the second corner, based on:
    an estimated depth, in the video feed, of the first corner, and
    an estimated depth, in the video feed, of the second corner,
  determine a second dimension, of the plurality of dimensions, associated with a distance between the first corner and the third corner, based on:
    the estimated depth, in the video feed, of the first corner, and
    an estimated depth, in the video feed, of the third corner, and determine a third dimension, of the plurality of dimensions, associated with a distance between the first corner and the fourth corner, based on:
the estimated depth, in the video feed, of the first corner, and
an estimated depth, in the video feed, of the fourth corner.

14. A method comprising:
identifying, by an augmented reality (AR) device, a package using a camera of the AR device;
identifying, by the AR device, a first corner of the package based on detecting differences in contrast, of a plurality of surfaces of the package, in a video feed generated by the AR device;
identifying, by the AR device, based on identifying the first corner:
a second corner of the package,
where identifying the second corner of the package comprises:
determining, beginning at a location of the first corner, an edge by identifying a portion of the package, near the first corner, where two contrast gradients meet,
traversing along the edge until a boundary between the package and a background of the video feed is reached, and
identifying, using the boundary, the second corner,
a third corner of the package, and
a fourth corner of the package;
determining, by the AR device, a plurality of dimensions of the package,
wherein determining the plurality of dimensions comprises:
determining a first dimension, of the plurality of dimensions, associated with a distance between the first corner and the second corner, based on:
an estimated depth, in the video feed, of the first corner, and
an estimated depth, in the video feed, of the second corner,
determining a second dimension, of the plurality of dimensions, associated with a distance between the first corner and the third corner, based on:
the estimated depth, in the video feed, of the first corner, and
an estimated depth, in the video feed, of the third corner, and
determining a third dimension, of the plurality of dimensions, associated with a distance between the first corner and the fourth corner, based on:
the estimated depth, in the video feed, of the first corner, and
an estimated depth, in the video feed, of the fourth corner; and
transmitting, by the AR device, to a shipping management platform, information identifying the plurality of dimensions,
where the plurality of dimensions is to be used to generate a loading configuration for loading the package, along with a plurality of other packages, into a cargo container.

15. The method of claim 14, where identifying the first corner comprises:
performing blurring of a background portion of the video feed to isolate the package from the background portion.

16. The method of claim 14, further comprising:
scanning a tag, associated with the package, to obtain information associated with the tag; and
transmitting, to the shipping management platform:
the information identifying the plurality of dimensions of the package, and
information associating the information associated with the tag and the information identifying the plurality of dimensions of the package.

17. The method of claim 14, further comprising:
displaying, on a display of the AR device, a plurality of visual indicators that are associated with a plurality of regions of the video feed.

18. The method of claim 17, where identifying the second corner of the package, the third corner of the package, and the fourth corner of the package comprises:
identifying, based at least in part on the plurality of regions of the video feed, the second corner of the package, the third corner of the package, and the fourth corner of the package.

19. The method of claim 14, where identifying the second corner of the package, the third corner of the package, and the fourth corner of the package comprises:
identifying the third corner of the package based on the third corner of the package being located in a second region of the video feed; and
identifying the fourth corner of the package based on the fourth corner of the package being located in a third region of the video feed.

20. The method of claim 14, where determining the first dimension comprises:
determining a point, included in a point cloud, associated with the second corner; and
determining the first dimension based on a distance, in the point cloud, between the point associated with the first corner and the point associated with the second corner.

* * * * *